US011507812B2

(12) United States Patent
Meng et al.

(10) Patent No.: US 11,507,812 B2
(45) Date of Patent: Nov. 22, 2022

(54) NEURAL NETWORK OPERATIONAL METHOD AND APPARATUS, AND RELATED DEVICE

(71) Applicant: Tencent Technology (Shenzhen) Company Limited, Shenzhen (CN)

(72) Inventors: Yu Meng, Shenzhen (CN); Yuwei Wang, Shenzhen (CN); Lixin Zhang, Shenzhen (CN); Xiaoyu Yu, Shenzhen (CN); Jianlin Gao, Shenzhen (CN); Jianping Zhu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 357 days.

(21) Appl. No.: 16/885,669

(22) Filed: May 28, 2020

(65) Prior Publication Data
US 2020/0293869 A1 Sep. 17, 2020

Related U.S. Application Data

(63) Continuation of application No. PCT/CN2018/118502, filed on Nov. 30, 2018.

(30) Foreign Application Priority Data

Jan. 25, 2018 (CN) .......................... 201810072678.9

(51) Int. Cl.
*G06F 1/08* (2006.01)
*G06N 3/063* (2006.01)
(Continued)

(52) U.S. Cl.
CPC ............... *G06N 3/063* (2013.01); *G06F 1/08* (2013.01); *G06F 7/523* (2013.01); *G06F 9/5094* (2013.01)

(58) Field of Classification Search
CPC ........... G06N 3/063; G06F 1/08; G06F 7/523; G06F 9/5094
See application file for complete search history.

(56) References Cited

U.S. PATENT DOCUMENTS 10,460,747 B2 * 10/2019 Roblek .................. G06N 3/088
11,321,542 B2 * 5/2022 Kalchbrenner ......... G06F 40/44
(Continued)

FOREIGN PATENT DOCUMENTS

CN 105813208 A 7/2016
CN 105981055 A 9/2016
(Continued)

OTHER PUBLICATIONS

Supplemental European Search report regarding EP18902036 dated Mar. 10, 2021, 10 pgs.
(Continued)

*Primary Examiner* — Zahid Choudhury
(74) *Attorney, Agent, or Firm* — Crowell & Moring LLP

(57) ABSTRACT

The present disclosure describes methods, devices, and storage mediums for adjusting computing resource. The method includes obtaining an expected pooling time of a target pooling layer and a to-be-processed data volume of the target pooling layer; obtaining a current clock frequency corresponding to at least one computing resource unit used for pooling; determining a target clock frequency according to the expected pooling time of the target pooling layer and the to-be-processed data volume of the target pooling layer; and in response to that the convolution layer associated with the target pooling layer completes convolution and the current clock frequency is different from the target clock frequency, switching the current clock frequency of the at least one computing resource unit to the target clock frequency, and performing pooling in the target pooling layer (Continued)

based on the at least one computing resource unit having the target clock frequency.

19 Claims, 9 Drawing Sheets

(51) Int. Cl.
  *G06F 7/523* (2006.01)
  *G06F 9/50* (2006.01)

(56) References Cited

U.S. PATENT DOCUMENTS

| | | | |
|---|---|---|---|
| 2017/0330586 A1 | 11/2017 | Roblek et al. | |
| 2019/0094941 A1* | 3/2019 | Sadasivam | G06F 1/3212 |
| 2020/0349419 A1* | 11/2020 | Suda | G06F 7/523 |
| 2022/0083857 A1* | 3/2022 | Li | G06F 7/523 |

FOREIGN PATENT DOCUMENTS

| | | | | |
|---|---|---|---|---|
| CN | 106779060 A | * | 5/2017 | G06N 3/063 |
| CN | 106779060 A | | 5/2017 | |

OTHER PUBLICATIONS

Alimonda et al., "A Feedback-Based Approach to DVFS in Data-Flow Applications," IEEE Transactions on Computer-Aided of Integrated Circuits and Systems, vol. 28, No. 11, Nov. 2009, pp. 1691-1704.

Liu et al., "Automatic Code Generation of Convolutional Neural Networks in FPGA Implementation," National University of Defense Technology, Changsha, China, 410073, 8 pgs.

International Search Report and Written Opinion of the International Searching Authority regarding International Appl. No. PCT/CN2018/118502 dated Feb. 1, 2019, 8 pages.

* cited by examiner

NEURAL NETWORK OPERATIONAL METHOD AND APPARATUS, AND RELATED DEVICE

RELATED APPLICATION

This application is a continuation application of PCT Patent Application No. PCT/CN2018/118502, filed on Nov. 30, 2018, which claims priority to Chinese Patent Application No. 201810072678.9, filed with the Chinese Patent Office on Jan. 25, 2018, both of which are incorporated herein by reference in their entireties.

FIELD OF THE TECHNOLOGY

This application relates to the field of computer technologies, and in particular, to a computing resource adjustment method and apparatus, a neural network operational method and apparatus, and a related device.

BACKGROUND OF THE DISCLOSURE

A convolutional neural network (CNN) is a kind of artificial neural network, and has become a research hotspot in the fields of speech analysis, image recognition, object classification, and the like. A weight sharing network structure of the convolutional neural network makes it more similar to a biological neural network, thereby reducing the complexity of a network model, and reducing the quantity of weights. The convolutional neural network is formed by stacking convolution layers and pooling layers in various forms, and the depth of a model expands from a dozen layers to hundreds of layer.

As the depth of the model increases, the requirements for computing power also gradually increase. To improve parallel efficiency of algorithms in the same layer, a convolution computation time and a pooling computation time in the same layer are required to be equal or close to each other. However, convolution computation and pooling computation are inhomogeneous in the algorithms, that is, the amount of convolution computation and the amount of pooling computation in the same layer may be in a directly proportional relationship or an inversely proportional relationship. For example, the amount of convolution computation in the second layer is twice the amount of convolution computation in the first layer. However, the amount of pooling computation in the second layer may be 10 times or 0.1 times the amount of pooling computation in the first layer. Therefore, if the pooling computation time and the convolution computation time in the same layer are desired to match each other, the worst scenario requirements need to be satisfied first, which causes the consumption of a large quantity of computing resources. However, there are idle computing resources in actual running, and as a result, utilization of the computing resources is low.

SUMMARY

The present disclosure describe various embodiments of a method for adjusting computing resource. The method includes obtaining, by a device, an expected pooling time of a target pooling layer and a to-be-processed data volume of the target pooling layer, a difference between the expected pooling time of the target pooling layer and an estimated convolution time of a convolution layer associated with the target pooling layer being less than a time threshold. The device includes a memory storing instructions and a processor in communication with the memory. The method further includes obtaining, by the device, a current clock frequency corresponding to at least one computing resource unit used for pooling; and determining, by the device, a target clock frequency according to the expected pooling time of the target pooling layer and the to-be-processed data volume of the target pooling layer. The method also includes, in response to that the convolution layer associated with the target pooling layer completes convolution and the current clock frequency is different from the target clock frequency, switching, by the device, the current clock frequency of the at least one computing resource unit to the target clock frequency, and performing pooling in the target pooling layer based on the at least one computing resource unit having the target clock frequency.

The present disclosure describe various embodiments of an apparatus for adjusting computing resource. The apparatus includes a memory storing instructions; and a processor in communication with the memory. When the processor executes the instructions, the processor is configured to cause the apparatus to obtain an expected pooling time of a target pooling layer and a to-be-processed data volume of the target pooling layer, a difference between the expected pooling time of the target pooling layer and an estimated convolution time of a convolution layer associated with the target pooling layer being less than a time threshold; obtain a current clock frequency corresponding to at least one computing resource unit used for pooling; determine a target clock frequency according to the expected pooling time of the target pooling layer and the to-be-processed data volume of the target pooling layer; and in response to that the convolution layer associated with the target pooling layer completes convolution and the current clock frequency is different from the target clock frequency, switch the current clock frequency of the at least one computing resource unit to the target clock frequency, and perform pooling in the target pooling layer based on the at least one computing resource unit having the target clock frequency.

The present disclosure describe various embodiments of a non-transitory computer readable storage medium storing computer readable instructions. The computer readable instructions, when executed by a processor, are configured to cause the processor to perform obtaining an expected pooling time of a target pooling layer and a to-be-processed data volume of the target pooling layer, a difference between the expected pooling time of the target pooling layer and an estimated convolution time of a convolution layer associated with the target pooling layer being less than a time threshold; obtaining a current clock frequency corresponding to at least one computing resource unit used for pooling, determining a target clock frequency according to the expected pooling time of the target pooling layer and the to-be-processed data volume of the target pooling layer, and in response to that the convolution layer associated with the target pooling layer completes convolution and the current clock frequency is different from the target clock frequency, switching the current clock frequency of the at least one computing resource unit to the target clock frequency, and performing pooling in the target pooling layer based on the at least one computing resource unit having the target clock frequency.

The present disclosure describe another embodiment of a neural network operational method, performed by a computing device, including:

obtaining an expected pooling time of a target pooling layer and a to-be-processed data volume of the target pooling layer, and obtaining a current clock frequency corresponding to a computing resource unit used for pooling, a difference between the expected pooling time of the target pooling layer and an estimated convolution time of a convolution layer associated with the target pooling layer being less than a time threshold;

determining a target clock frequency according to the expected pooling time of the target pooling layer and the to-be-processed data volume of the target pooling layer; and switching the current clock frequency to the target clock frequency in a case that the convolution layer associated with the target pooling layer completes convolution and the current clock frequency is different from the target clock frequency, and performing pooling in the target pooling layer based on the computing resource unit having the target clock frequency.

The present disclosure describe another embodiment of a computing resource adjustment apparatus, including:

an obtaining module, configured to obtain an expected pooling time of a target pooling layer and a to-be-processed data volume of the target pooling layer, and obtain a current clock frequency corresponding to a computing resource unit used for pooling, a difference between the expected pooling time of the target pooling layer and an estimated convolution time of a convolution layer associated with the target pooling layer being less than a time threshold;

a first determining module, configured to determine a target clock frequency according to the expected pooling time of the target pooling layer and the to-be-processed data volume of the target pooling layer; and a switching module, configured to switch the current clock frequency to the target clock frequency in a case that the convolution layer associated with the target pooling layer completes convolution and the current clock frequency is different from the target clock frequency, and perform pooling in the target pooling layer based on the computing resource unit having the target clock frequency.

The present disclosure describe another embodiment of a neural network operational apparatus, including:

an obtaining module, configured to obtain an expected pooling time of a target pooling layer and a to-be-processed data volume of the target pooling layer, and obtain a current clock frequency corresponding to a computing resource unit used for pooling, a difference between the expected pooling time of the target pooling layer and an estimated convolution time of a convolution layer associated with the target pooling layer being less than a time threshold;

a first determining module, configured to determine a
      target clock frequency according to the expected pooling time of the target pooling layer and the to-be-processed data volume of the target pooling layer; and a switching module, configured to switch the current clock frequency to the target clock frequency in a case that the convolution layer associated with the target pooling layer completes convolution and the current clock frequency is different from the target clock frequency, and perform pooling in the target pooling layer based on the computing resource unit having the target clock frequency.

The present disclosure describe another embodiment of a computing device, including a processor and a memory, the processor being connected to the memory, the memory being configured to store a program code, and the processor being configured to invoke the program code to perform the foregoing method.

The present disclosure describe another embodiment of a computer storage medium, the computer storage medium storing a computer program, the computer program including a program instruction, and the program instruction, when executed by a processor, performing the foregoing method.

BRIEF DESCRIPTION OF THE DRAWINGS

To describe the technical solutions in the embodiments of this application or in the existing technology more clearly, the following briefly describes the accompanying drawings required for describing the embodiments or the existing technology. Apparently, the accompanying drawings in the following description show merely some embodiments of this application, and a person of ordinary skill in the art may still derive other drawings from these accompanying drawings without creative efforts.

DETAILED DESCRIPTION

Figure 1A:
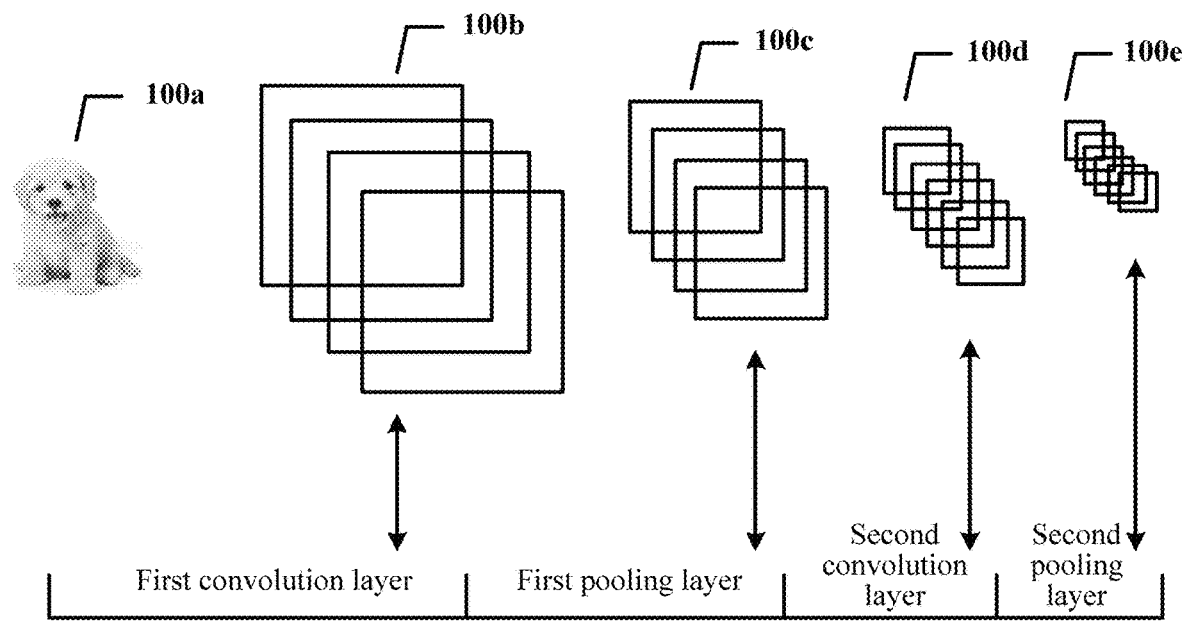
FIG. 1A and FIG. 1B are schematic diagrams of a scenario of a computing resource adjustment method according to an embodiment of this application.

The device and methods now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements.

Likewise, many modifications and other embodiments of the device and methods described herein will come to mind to one of skill in the art to which the invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

Throughout the specification and claims, terms may have nuanced meanings suggested or implied in context beyond an explicitly stated meaning Likewise, the phrase "in one embodiment" or "in one implementation" as used herein does not necessarily refer to the same embodiment or implementation and the phrase "in another embodiment" or "in another implementation" as used herein does not necessarily refer to a different embodiment or implementation.

It is intended, for example, that claimed subject matter includes combinations of exemplary embodiments or implementations in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" or "at least one" as used herein, depending at least in part upon context, may be used to describe any feature, structure, or characteristic in a singular sense or may be used to describe combinations of features, structures or characteristics in a plural sense. Similarly, terms, such as "a", "an", or "the", again, may be understood to convey a singular usage or to convey a plural usage, depending at least in part upon context. In addition, the term "based on" or "determined by" may be understood as not necessarily intended to convey an exclusive set of factors and may, instead, allow for existence of additional factors not necessarily expressly described, again, depending at least in part on context.

Unless defined otherwise, all technical and scientific terms used herein have the same meaning as commonly understood by one of skill in the art to which the invention pertains. Although any methods and materials similar to or equivalent to those described herein may be used in the practice or testing of the present invention, the preferred methods and materials are described herein.

The present disclosure describes various embodiments of a method for adjusting computing resource. The method may be applied to a terminal device or a server, and is particularly applicable to a scenario with massive data computation requirements, for example, a scenario in which massive yellow images are detected or massive images need to be classified. The method is also particularly applied to a scenario in which the terminal device is sensitive to power consumption, for example, image detection and recognition of an intelligent terminal device and an unmanned aerial vehicle.

In the following embodiments of this application, the foregoing method being applied to the terminal device is used as an example for description.

Figure 1B:
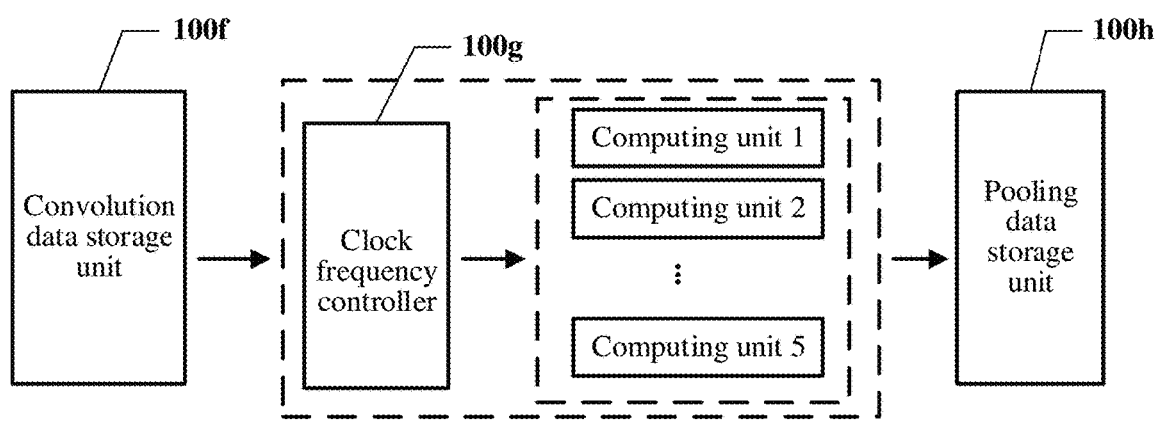

FIG. 1A and FIG. 1B are schematic diagrams of a scenario of a computing resource adjustment method according to an embodiment of this application.

As shown in FIG. 1A, two convolution layers (a first convolution layer and a second convolution layer) and two pooling layers (a first pooling layer and a second pooling layer) in a convolutional neural network model are used as an example for description. A size of an image inputted to the convolutional neural network model is 256×256. Therefore, it may be predicted that an estimated convolution time of the first convolution layer is 30 μs, an estimated convolution time of the second convolution layer is 50 μs, a data volume of the first pooling layer is 4 KB, and a data volume of the second pooling layer is 1 KB. To make a convolution operation time and a pooling operation time in the same layer match each other, an estimated convolution time of a convolution layer and an expected pooling time of a corresponding pooling layer in the same layer are close. Herein, due to a hardware factor, the expected pooling time and the estimated convolution time are close but not equal, that is, it is predicted that an expected pooling time of the first pooling layer may be 33 μs and an expected pooling time of the second pooling layer may be 46 μs.

In a general condition, an average clock frequency of a single computing unit is 300 MHz, and a corresponding computing power value is 1. The general condition means that temperature of a central processing unit is 40° C. or lower. As shown in FIG. 1B, according to the foregoing conditions, that is, the expected pooling time of the first pooling layer is 33 μs, the expected pooling time of the second pooling layer is 46 μs, a minimum data volume of the two pooling layers is 1 KB, and the computing power value of the single computing unit is 1, it may be calculated in advance that the quantity of computing units used for pooling operations is 5. Once the quantity of computing units is determined, it will not be changed in subsequent convolution operations and pooling operations, only a clock frequency of the computing unit is adjusted. After the quantity of computing units is determined, an image 100a with a size of 256×256 is inputted to an input layer of a convolutional neural network. A convolution kernel, as a window, slides through all areas of the image 100a in sequence, that is, the convolution kernel performs a convolution operation in the image 100a. During 30 μs of a convolution operation process in the first convolution layer, that is, during the predicted 30 μs estimated convolution time of the first convolution layer, according to the 33 μs expected pooling time of the first pooling layer, the corresponding data volume 4 KB, and a 300 MHz current clock frequency of the computing unit, a clock frequency controller 100g may calculate in advance that a target clock frequency is 450 MHz.

After the convolution operation is performed on the image 100a in the first convolution layer, a feature image 100b is generated. The feature image 100b is stored in a convolution data storage unit 100f, and the clock frequency controller 100g adjusts the clock frequency of a computing unit 1 from 300 MHz to 450 MHz, the clock frequency of a computing unit 2 from 300 MHz to 450 MHz, the clock frequency of a computing unit 3 from 300 MHz to 450 MHz, the clock frequency of a computing unit 4 from 300 MHz to 450 MHz, and the clock frequency of a computing unit 5 from 300 MHz to 450 MHz. After all the computing units are adjusted, the feature image 100b stored in the convolution data storage unit 100f is inputted to the first pooling layer, and a pooling operation is performed on the feature image 100b by using the five computing units having the clock frequency of 450 MHz. An actual pooling time of the pooling operation is 28 μs, that is, the actual pooling time (28 μs) of the first pooling layer is close to the estimated convolution time (30 μs) of the first convolution layer. A feature image 100c obtained after pooling is stored in a pooling data storage unit 100h and used for a convolution operation of the second convolution layer.

The feature image 100c is inputted to the second convolution layer for a convolution operation. During 50 μs of a convolution operation process in the second convolution layer, that is, during the predicted 50 μs estimated convolution time of the second convolution layer, according to the 46 μs expected pooling time of the second pooling layer, the corresponding data volume 1 KB, and a 450 MHz current clock frequency corresponding to each computing unit, the clock frequency controller 100g may calculate that the target clock frequency is 100 MHz. Herein, the current clock frequency in this round is 450 MHz because in the previous pooling operation process, the clock frequency is adjusted from 300 MHz to 450 MHz, while the current clock frequency of the second convolution layer is the same as the current clock frequency of the first pooling layer.

After the convolution operation is performed on the feature image 100c in the second convolution layer, a feature image 100d is generated. The feature image 100d is stored in the convolution data storage unit 100f, and the clock frequency controller 100g adjusts the clock frequency of the computing unit 1 from 450 MHz to 100 MHz, the clock frequency of the computing unit 2 from 450 MHz to 100 MHz, the clock frequency of the computing unit 3 from 450 MHz to 100 MHz, the clock frequency of the computing unit 4 from 450 MHz to 100 MHz, and the clock frequency of the computing unit 5 from 450 MHz to 100 MHz. After all the computing units are adjusted, the feature image 100d stored in the convolution data storage unit 100f is inputted to the second pooling layer, and a pooling operation is performed on the feature image 100d by using the five computing units having the clock frequency of 100 MHz. An actual pooling time of the pooling operation is 52 µs, that is, the actual pooling time (52 µs) of the second pooling layer is close to the estimated convolution time (50 µs) of the second convolution layer. A feature image 100e obtained after pooling is stored in the pooling data storage unit 100h.

In the foregoing technical solution, by adjusting the clock frequencies of the computing units, the actual pooling time and the estimated convolution time in the same layer are close, so that the convolution time and the pooling time may become homogeneous, computing resources are saved, and the computing resources are prevented from staying in an idle state, thus improving utilization of the computing resources. For specific processes of determining the quantity of computing units, determining the target clock frequency, and adjusting the clock frequency of a computing resource unit, reference may be made to embodiments corresponding to FIG. 2 to FIG. 7 below.

Figure 2:
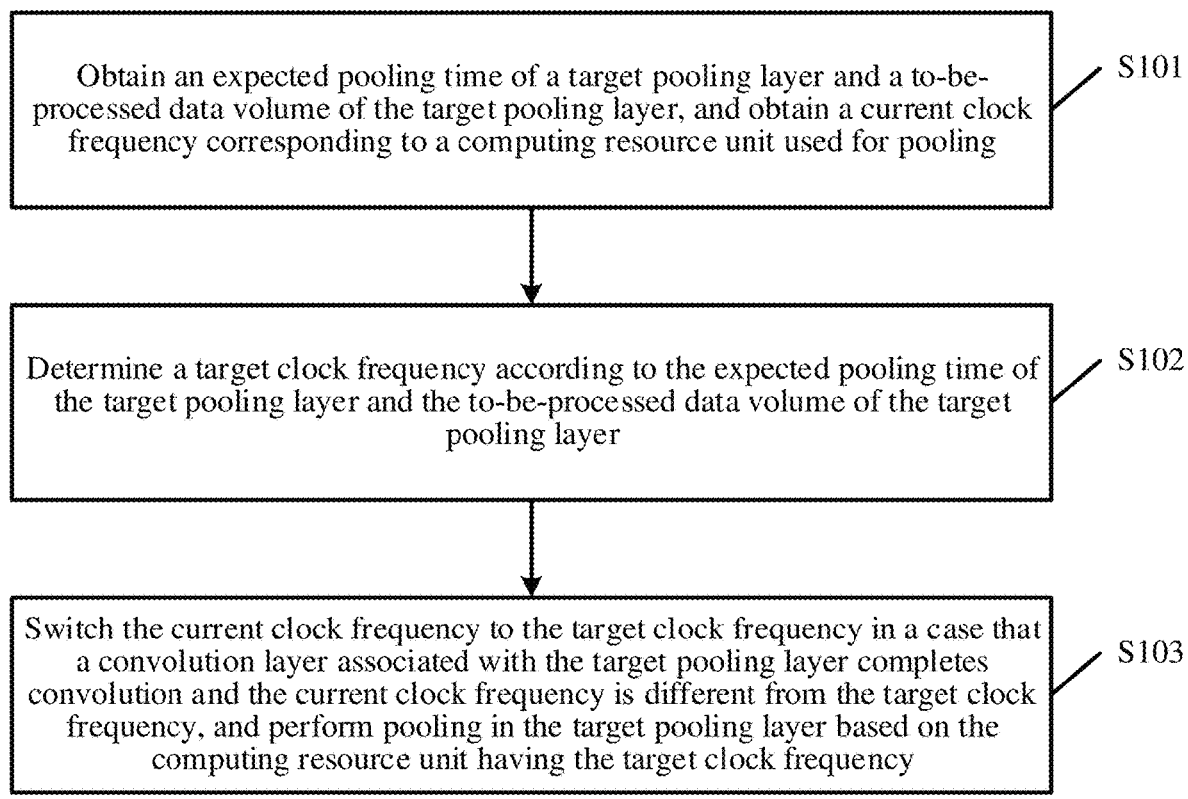
FIG. 2 is a schematic flowchart of a computing resource adjustment method according to an embodiment of this application.

Further, FIG. 2 is a schematic flowchart of a computing resource adjustment method according to an embodiment of this application. As shown in FIG. 2, the method may include:

Step S101. Obtain an expected pooling time of a target pooling layer and a to-be-processed data volume of the target pooling layer, and obtain a current clock frequency corresponding to a computing resource unit used for pooling, a difference between the expected pooling time of the target pooling layer and an estimated convolution time of a convolution layer associated with the target pooling layer being less than a time threshold. In the present disclosure, "a computing resource unit" used for pooling may refer to one or more computing resource units used for pooling.

Specifically, a convolutional neural network model is formed by stacking a plurality of convolution layers and a plurality of pooling layers. In a process, a processing sequence is as follows: a convolution layer 1, a pooling layer 1, a convolution layer 2, a pooling layer 2, ..., a convolution layer N, and a pooling layer N. Convolution is performed in the convolution layers, and pooling is performed in the pooling layers. A convolution layer i and a pooling layer i are in the same layer, where i∈[1, N]. After convolution in a corresponding convolution layer, pooling in the same layer is performed, that is, there is a sequence dependency relationship between convolution data generated by convolution and pooling data generated by pooling. The convolution data is generated first, and then the pooling data is generated.

In the convolutional neural network model, a pooling layer that is adjacent to a pooling layer under pooling and that has not been processed is referred to as a target pooling layer, or a pooling layer that is associated with a convolution layer under convolution is referred to as a target pooling layer. For example, there are four convolution layers and four pooling layers in the convolutional neural network model; if pooling is being performed in a pooling layer 2, a pooling layer 3 (a pooling layer adjacent to the pooling layer 2 and has not been processed) is a target pooling layer; if convolution is being performed in a convolution layer 2, the pooling layer 2 (a pooling layer associated with the convolution layer 2) is a target pooling layer.

The expected pooling time of the target pooling layer and the to-be-processed data volume of the target pooling layer are obtained, where the expected pooling time of the target pooling layer is close to the estimated convolution time of the convolution layer associated with the target pooling layer (due to a hardware factor, the expected pooling time and the estimated convolution time in the same layer are close, but not equal). That is, the difference between the estimated convolution time of the convolution layer and the expected pooling time of the pooling layer in the same layer is within the time threshold. The time threshold is set in advance according to performance of the model and a current hardware parameter.

The estimated convolution time of the convolution layer is related to the depth, complexity, and input data of a convolutional neural network model. Therefore, an estimated convolution time of any convolution layer in the convolutional neural network model may be predicted, and an expected pooling time of any pooling layer may be correspondingly predicted. For example, an estimated convolution time of a convolution layer 1 is 20 µs, an estimated convolution time of a convolution layer 2 is 30 µs, and a time threshold is 3 ms. Correspondingly, an expected pooling time of a pooling layer 1 corresponding to the convolution layer 1 is 19 µs (a difference between the estimated convolution time and the expected pooling time is 1 ms and is less than the time threshold of 3 ms), and an expected pooling time of a pooling layer 2 corresponding to the convolution layer 2 is 32 µs (a difference between the estimated convolution time and the expected pooling time is 2 ms and is less than the time threshold of 3 ms).

During pooling, a clock frequency of a computing resource unit (the computing resource unit herein may be the computing unit 1 to the computing unit 5 in the embodiment of FIG. 1B) used for pooling is referred to as a current clock frequency. Alternatively, during convolution, a clock frequency of a computing resource unit may be referred to as a current clock frequency. The foregoing computing resource unit is used for pooling. Therefore, the clock frequency of the computing resource unit remains unchanged in the convolution process. For example, if pooling is being performed in the pooling layer 2, a clock frequency used for the pooling is 200 MHz. Therefore, a current clock frequency is 200 MHz. If convolution is being performed in the convolution layer 3, a current clock frequency is still 200 MHz, because during the convolution in the convolution layer 3, the current clock frequency of the computing resource unit is equal to the clock frequency in the adjacent pooling layer 2 that has been processed, that is, from the beginning of the pooling in the pooling layer 2 to the end of the convolution in the convolution layer 3, the current clock frequency of the computing resource unit used for pooling remains unchanged at 200 MHz. The computing resource unit is a minimum unit component used for a numeric operation, an instruction operation, and a logical operation in a central processing unit. The computing resource unit may operate at a plurality of clock frequencies. A higher clock frequency indicates stronger computing power, and a lower clock frequency indicates lower computing power. The computing resource unit used for pooling may be used for implementing boundary processing, slide window processing, a maximum pooling operation, or an average pooling operation in pooling.

Step S102. Determine a target clock frequency according to the expected pooling time of the target pooling layer and the to-be-processed data volume of the target pooling layer.

In some embodiments, step S102 includes: calculating a sum of computing power values of computing resource units having an average clock frequency, to obtain a total computing power value (for example, if a computing power value of a computing resource unit having an average clock frequency is 2, and the quantity of computing resource units used for pooling is 3, a total computing power value is 3*2=6). The average clock frequency is an average value of a plurality of clock frequencies provided by a system, and the computing power value refers to an instruction processing capacity value of the computing resource unit. A higher clock frequency indicates a higher power value of the computing resource unit, and the higher power value of the computing resource unit indicates higher power consumption; a lower clock frequency indicates a lower power value of the computing resource unit, and the lower power value of the computing resource unit indicates lower power consumption. The system may refer to a field programmable logic array (FPGA)-based hardware platform system, or may refer to an application-specific integrated circuit (ASIC) hardware platform system. The to-be-processed data volume of the target pooling layer is extracted, and a ratio of the to-be-processed data volume of the target pooling layer to the total computing power value is determined as an average pooling time of the target pooling layer. A ratio of the expected pooling time of the target pooling layer (the difference between the expected pooling time of the target pooling layer and the estimated convolution time of the convolution layer associated with the target pooling layer is within the time threshold) to the average pooling time is determined as a speedup ratio of the target pooling layer. The target clock frequency is determined according to the speedup ratio of the target pooling layer, a speedup ratio of a reference pooling layer, and the current clock frequency.

The reference pooling layer is a pooling layer that is adjacent to the target pooling layer and that is being processed or has been processed, that is, a pooling layer under pooling may be referred to as the reference pooling layer, or a pooling layer that is adjacent to a convolution layer under convolution and that has been processed may be referred to as the reference pooling layer. In one implementation, the reference pooling layer is a pooling layer that is adjacent to the target pooling layer and is processed prior to the target pooling layer. Similarly, the speedup ratio of the reference pooling layer is determined according to an expected pooling time of the reference pooling layer and a to-be-processed data volume of the reference pooling layer. A specific process of determining the speedup ratio of the reference pooling layer includes: extracting the to-be-processed data volume of the reference pooling layer, determining a ratio of the to-be-processed data volume of the reference pooling layer to the total computing power value as an average pooling time of the reference pooling layer, and determining a ratio (a result obtained by dividing the expected pooling time of the reference pooling layer by the average pooling time of the reference pooling layer) of the expected pooling time of the reference pooling layer (a difference between the expected pooling time of the reference pooling layer and an estimated convolution time of a convolution layer associated with the reference pooling layer is within the time threshold) to the average pooling time of the reference pooling layer as the speedup ratio of the reference pooling layer.

In some embodiments, step S102 may further include: calculating a sum of computing power values of computing resource units having an average clock frequency, to obtain a total computing power value. The to-be-processed data volume of the target pooling layer is extracted, and a ratio of the to-be-processed data volume of the target pooling layer to the total computing power value is determined as an average pooling time of the target pooling layer. A ratio of the expected pooling time of the target pooling layer (the difference between the expected pooling time of the target pooling layer and the estimated convolution time of the convolution layer associated with the target pooling layer is within the time threshold) to the average pooling time is determined as a speedup ratio of the target pooling layer. The target clock frequency is determined according to the speedup ratio of the target pooling layer and the average clock frequency. The average clock frequency is the average value of the plurality of clock frequencies provided by the system. Based on the foregoing, the target clock frequency may be obtained based on the current clock frequency of the computing resource unit, or may be obtained based on the average clock frequency of the computing resource unit. The current clock frequency is a dynamic variable, and the average clock frequency is a fixed constant.

Step S103. Switch the current clock frequency to the target clock frequency in a case that a convolution layer associated with the target pooling layer completes convolution and the current clock frequency is different from the target clock frequency, and perform pooling in the target pooling layer based on the computing resource unit having the target clock frequency. In the present disclosure, "a computing resource unit" may refer to a computer resource unit or a group of computing resource units as shown in FIG. 1B.

Specifically, it is determined that the convolution layer associated with the target pooling layer completes convolution upon detecting that convolution data generated in the convolution layer associated with the target pooling layer reaches a data boundary.

For example, when an image is inputted to a convolutional neural network model, to keep a size of a feature image generated after convolution consistent with a size of the input image, a boundary is added to an outer layer of the input image. Generally, a value 0 is added to the outer layer of the image, to expand the size of the input image, thereby ensuring the size of the feature image after convolution to be consistent with the size of the input image. Therefore, if it is continuously detected a value of convolution data generated after convolution is 0, it is determined that the convolution data reaches the data boundary.

When the convolution layer associated with the target pooling layer completes convolution, the current clock frequency and the target clock frequency are detected.

If the current clock frequency is different from the target clock frequency, the current clock frequency is switched to the target clock frequency; convolution data generated by the corresponding convolution layer is extracted by the target pooling layer into the target pooling layer; and, the computing resource unit having the target clock frequency perform the target pooling layer by pooling (boundary processing, slide window processing, a maximum pooling operation, or an average pooling operation) on the convolution data.

If the convolution layer associated with the target pooling layer completes convolution, and the current clock frequency is the same as the target clock frequency, the current clock frequency remains unchanged, and in the target pooling layer, based on the computing resource unit having the current clock frequency, pooling is continuously performed on the convolution data generated by the convolution.

The present disclosure describes that the target clock frequency is calculated before pooling is performed in the target pooling layer. The target clock frequency may be calculated during pooling in the reference pooling layer, or may be calculated during convolution in the convolution layer associated with the target pooling layer. During pooling in the target pooling layer, the target pooling layer may act as a reference pooling layer for a next pooling layer that is adjacent to the target pooling layer and has not been processed: under this circumstances, the target pooling layer is the next reference pooling layer for the next pooling layer. By switching the clock frequency of the computing resource unit, an actual pooling time of the target pooling layer is close to the expected pooling time of the target pooling layer and the estimated convolution time of the corresponding convolution layer, wherein the actual pooling time of the target pooling layer is actual duration counted/recorded/obtained after pooling in the target pooling layer is completed.

Figure 3:
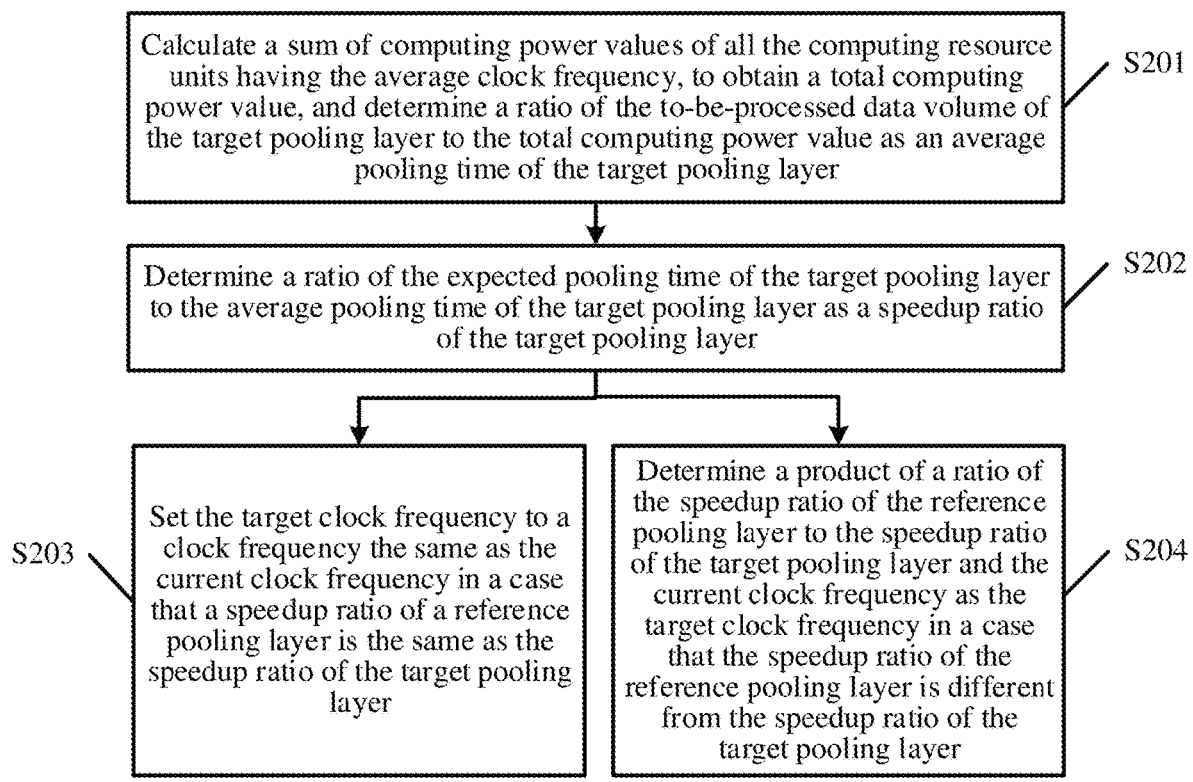
FIG. 3 is a schematic flowchart of a method for determining a target clock frequency according to an embodiment of this application.

FIG. 3 is a schematic flowchart of a method for determining a target clock frequency according to an embodiment of this application. As shown in FIG. 3, a specific process of determining the target clock frequency includes the following step S201 to step S203, and step S201 to step S203 are a specific embodiment of step S102 in the embodiment corresponding to FIG. 2.

Step S201. Calculate a sum of computing power values of all the computing resource units having the average clock frequency, to obtain a total computing power value, and determine a ratio of the to-be-processed data volume of the target pooling layer to the total computing power value as an average pooling time of the target pooling layer. In one implementation, the total computing power value may refer to a sum of computing power values of the one or more computing resource units having the average clock frequency for pooling. For example, the one or more computing resource units may include the computing unit 1, the computing unit 2, . . . , computing unit 5 as shown in FIG. 1B.

Specifically, the sum of the computing power values of all the computing resource units having the average clock frequency is calculated to obtain the total computing power value. The average clock frequency refers to an average value of a plurality of clock frequencies provided by a system. A ratio (a result obtained by dividing the to-be-processed data volume of the target pooling layer by the total computing power value) of the to-be-processed data volume of the target pooling layer to the calculated total computing power value is determined as the target average pooling time or the average pooling time of the target pooling layer.

Step S202. Determine a ratio of the expected pooling time of the target pooling layer to the average pooling time of the target pooling layer as a speedup ratio of the target pooling layer.

Specifically, the ratio (a result obtained by dividing the expected pooling time of the target pooling layer by the average pooling time of the target pooling layer) of the expected pooling time of the target pooling layer to the average pooling time of the target pooling layer is determined as the speedup ratio of the target pooling layer.

Step S203. Set the target clock frequency to a clock frequency the same as the current clock frequency when a speedup ratio of a reference pooling layer is the same as the speedup ratio of the target pooling layer.

Specifically, the speedup ratio of the reference pooling layer is extracted, and the speedup ratio of the target pooling layer and the speedup ratio of the reference pooling layer are detected. The target clock frequency is set to a clock frequency the same as the current clock frequency in a case that the speedup ratio of the reference pooling layer is the same as the speedup ratio of the target pooling layer, that is, the current clock frequency remains unchanged when pooling is performed in the target pooling layer. For example, the speedup ratio of the target pooling layer is 3, the speedup ratio of the reference pooling layer is 3, and the current clock frequency is 350 MHz. Therefore, the target clock frequency is set to 350 MHz, that is, the target clock frequency is unchanged and equal to the current clock frequency.

Even if the speedup ratio of the target pooling layer is 1 (indicating that the expected pooling time of the target pooling layer is close or equal to an actual pooling time of the target pooling layer), it only indicates that the target clock frequency is equal to the average clock frequency, but does not have any linear relationship with the current clock frequency. This is because the current clock frequency is a constantly adjusted variable and the current clock frequency may be equal or not equal to the average clock frequency. Therefore, if the current clock frequency is used to determine the target clock frequency, a relationship among the three variables, that is, the speedup ratio of the target pooling layer, the speedup ratio of the reference pooling layer, and the current clock frequency further needs to be considered.

Step S204. Determine a ratio of the speedup ratio of the reference pooling layer to the speedup ratio of the target pooling layer as a speedup factor, and determine a product of the speedup factor and the current clock frequency as the target clock frequency in a case that the speedup ratio of the reference pooling layer is different from the speedup ratio of the target pooling layer.

Specifically, when the speedup ratio of the target pooling layer is different from the speedup ratio of the reference pooling layer, the ratio (a result obtained by dividing the speedup ratio of the reference pooling layer by the speedup ratio of the target pooling layer) of the speedup ratio of the reference pooling layer to the speedup ratio of the target pooling layer is multiplied by the current clock frequency, to obtain the target clock frequency.

For example, the speedup ratio of the target pooling layer is 6, the speedup ratio of the reference pooling layer is 3, and the current clock frequency is 220 MHz. Therefore, the target clock frequency is (3/6)*220 MHz=110 MHz. The speedup ratio of the reference pooling layer is generated according to an expected pooling time of the reference pooling layer and a to-be-processed data volume of the reference pooling layer, and the reference pooling layer is a pooling layer that is adjacent to the target pooling layer and that is being processed or has been processed.

That is, a target clock frequency of a computing resource unit in next pooling is calculated according to a ratio between speedup ratios of two pooling layers and a current clock frequency. For example, pooling is being performed in a reference pooling layer, and a current clock frequency of the reference pooling layer is 200 MHz. An expected pooling time of a target pooling layer is 40 μs, and an average pooling time of the target pooling layer is 10 μs. Therefore, a speedup ratio of the target pooling layer is 4. An expected pooling time of the reference pooling layer is 60 μs, and an average pooling time of the reference pooling layer is 30 μs. Therefore, a speedup ratio of the reference pooling layer is 2. According to a proportional relationship among the speedup ratio of the target pooling layer, the speedup ratio of the reference pooling layer, and the current clock frequency, a target clock frequency is 100 MHz ((⅔)*200 MHz=100 MHz).

Figure 4:
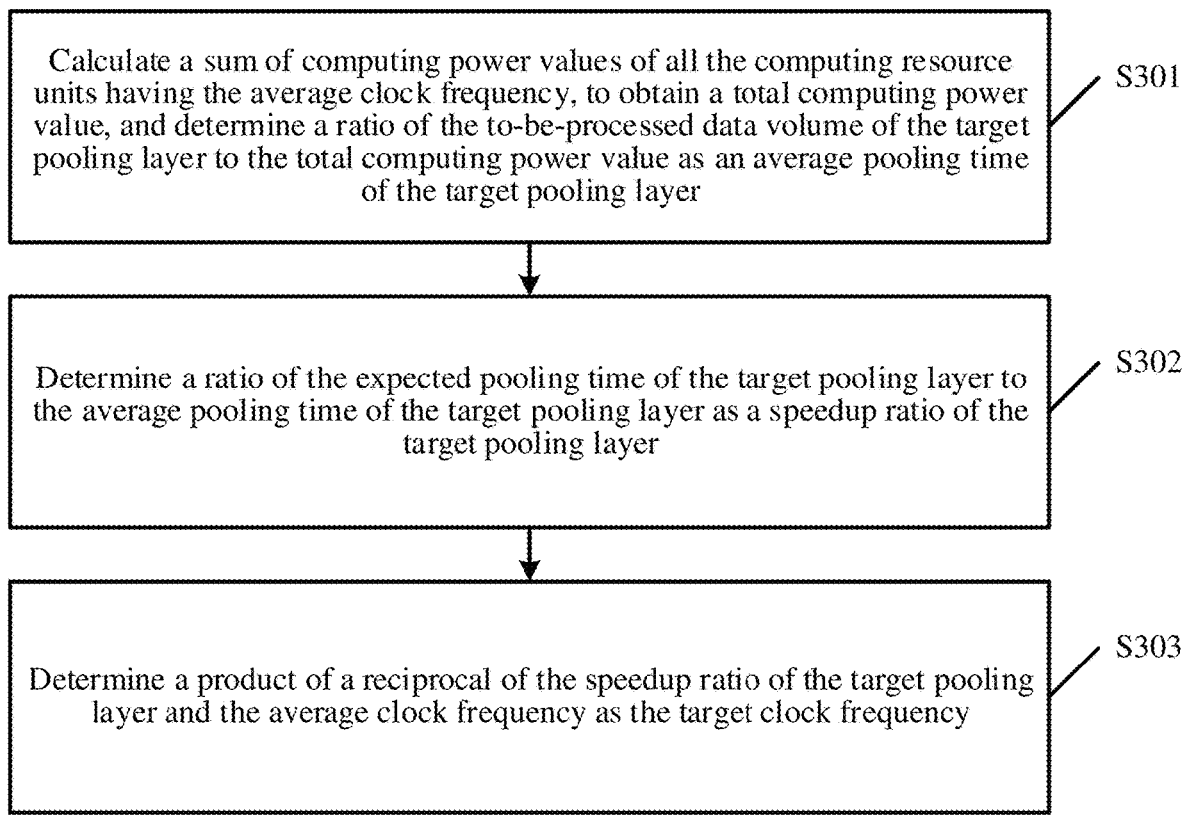
FIG. 4 is a schematic flowchart of another method for determining a target clock frequency according to an embodiment of this application.

FIG. 4 is a schematic flowchart of another method for determining a target clock frequency according to an embodiment of this application. As shown in FIG. 4, a specific process of determining the target clock frequency includes the following step S301 to step S303, and step S301 to step S303 are a specific embodiment of step S102 in the embodiment corresponding to FIG. 2.

Step S301. Calculate a sum of computing power values of all the computing resource units having the average clock frequency, to obtain a total computing power value, and determine a ratio of the to-be-processed data volume of the target pooling layer to the total computing power value as an average pooling time of the target pooling layer. In one implementation, the total computing power value may refer to a sum of computing power values of the one or more computing resource units having the average clock frequency for pooling. For example, the one or more computing resource units may include the computing unit 1, the computing unit 2, . . . , computing unit 5 as shown in FIG. 1B.

Specifically, the sum of the computing power values of all the computing resource units having the average clock frequency is calculated to obtain the total computing power value. The average clock frequency refers to an average value of a plurality of clock frequencies provided by a system. The ratio (a result obtained by dividing the to-be-processed data volume of the target pooling layer by the total computing power value) of the to-be-processed data volume of the target pooling layer to the calculated total computing power value is determined as the target average pooling time.

Step S302. Determine a ratio of the expected pooling time of the target pooling layer to the average pooling time of the target pooling layer as a speedup ratio of the target pooling layer.

Specifically, the ratio (a result obtained by dividing the expected pooling time of the target pooling layer by the average pooling time of the target pooling layer) of the expected pooling time of the target pooling layer to the average pooling time of the target pooling layer is determined as the speedup ratio of the target pooling layer.

Step S303. Determine a product of a reciprocal of the speedup ratio of the target pooling layer and the average clock frequency as the target clock frequency. In one implementation, step S303 may include dividing the average clock frequency by the speedup ratio of the target pooling layer to obtain the target clock frequency.

Specifically, a result obtained by multiplying the reciprocal of the speedup ratio of the target pooling layer by the average clock frequency is determined as the target clock frequency. That is, a target clock frequency of a computing resource unit in next pooling is calculated according to the speedup ratio of the target pooling layer and the average clock frequency (the average clock frequency remains unchanged). For example, the expected pooling time of the target pooling layer is 100 μs, and the average pooling time of the target pooling layer is 20 μs. Therefore, the speedup ratio of the target pooling layer is 5. The average clock frequency is 500 MHz. Therefore, the target clock frequency is 100 MHz ((⅕)*500 MHz=100 MHz).

According to this embodiment of this application, an expected pooling time of a target pooling layer and a to-be-processed data volume of the target pooling layer are obtained, and a current clock frequency corresponding to a computing resource unit used for pooling is obtained; a target clock frequency is determined according to the expected pooling time of the target pooling layer and the to-be-processed data volume of the target pooling layer; the current clock frequency is switched to the target clock frequency in a case that a convolution layer associated with the target pooling layer completes convolution and the current clock frequency is different from the target clock frequency; and pooling is performed in the target pooling layer based on the computing resource unit having the target clock frequency. A clock frequency of a computing resource unit may be dynamically adjusted according to an expected pooling time of a pooling layer and a to-be-processed data volume of the pooling layer, so that an actual pooling time of any pooling layer is close to an expected pooling time of the pooling layer, and the actual pooling time of any pooling layer matches an estimated convolution time of a corresponding convolution layer. Therefore, by adjusting the clock frequency of the computing resource unit, an actual pooling time and an estimated convolution time of any layer may be close to each other as required, thus avoiding idling of computing resources, and improving utilization of the computing resources.

Figure 5:
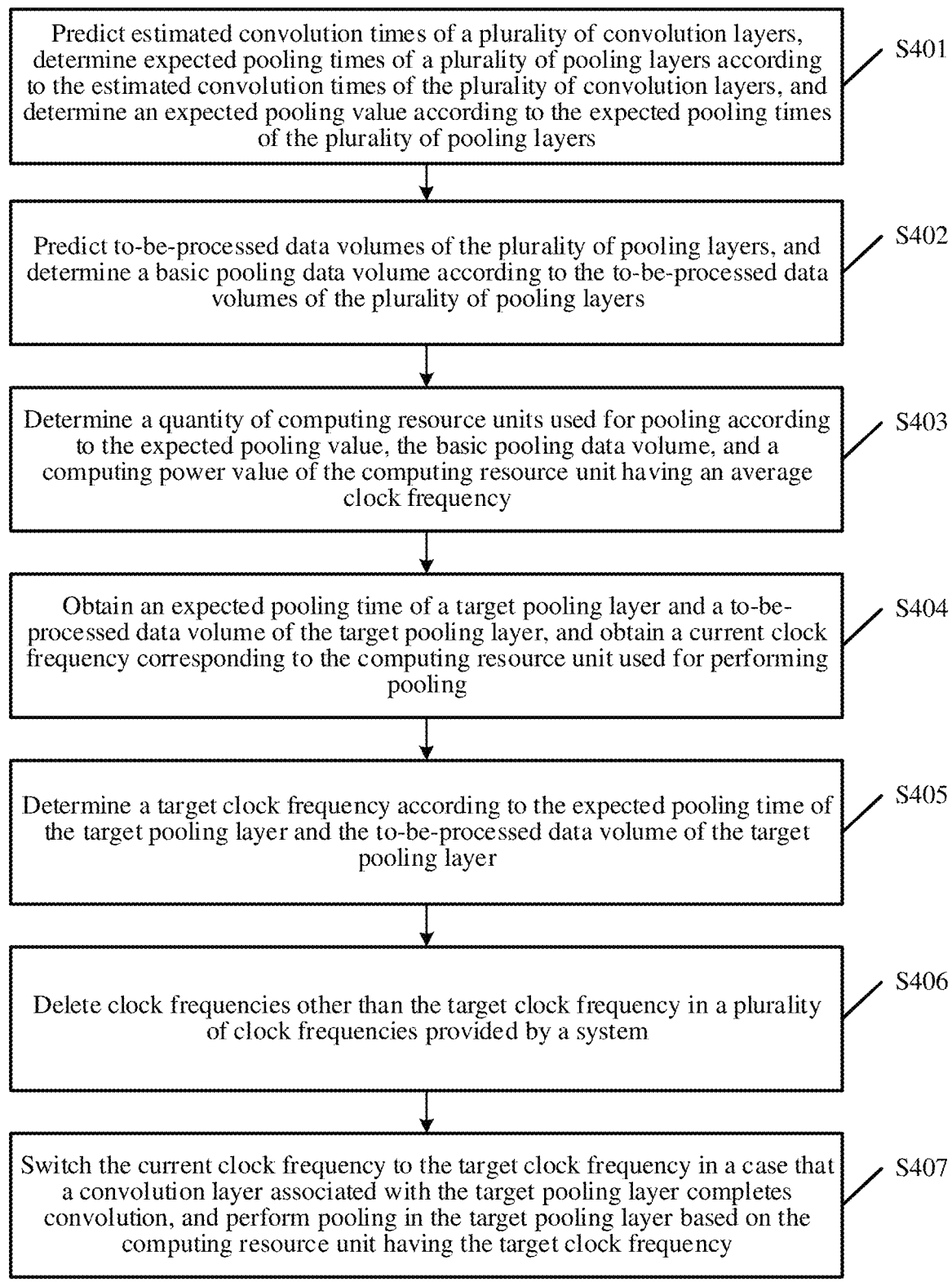
FIG. 5 is a schematic flowchart of another computing resource adjustment method according to an embodiment of this application.

Furthermore, FIG. 5 is a schematic flowchart of another computing resource adjustment method according to an embodiment of this application. As shown in FIG. 5, the computing resource adjustment method may include:

Step S401. Predict estimated convolution times of a plurality of convolution layers, determine expected pooling times of a plurality of pooling layers according to the estimated convolution times of the plurality of convolution layers, and determine an expected pooling value according to the expected pooling times of the plurality of pooling layers.

Specifically, according to the depth, complexity, and an input data size of a convolutional neural network model, an estimated convolution time of each convolution layer in the convolutional neural network model is predicted, expected pooling times of a plurality of pooling layers are determined according to the predicted estimated convolution times of the plurality of convolution layers. Due to a hardware factor, a difference between the estimated convolution time of the convolution layer and the expected pooling time of the pooling layer in the same layer is within a time threshold. In another implementation, for each pooling layer in the plurality of pooling layers, an expected pooling time of the pooling layer is determined according to the predicted estimated convolution time of corresponding convolution layer in the plurality of convolution layers. The expected pooling times of the plurality of pooling layers may include a plurality of expected pooling times for the plurality of pooling layers.

The expected pooling value is determined according to the expected pooling times of the plurality of pooling layers in the convolutional neural network model. The expected pooling value is obtained by calculating an average value of the expected pooling times of the plurality of pooling layers, and represents an average value of the expected pooling times. Optionally, the expected pooling value may be an average expected pooling time for the plurality of pooling layers in the convolutional neural network model.

For example, there are three convolution layers and three pooling layers in a convolutional neural network model, an estimated convolution time of a convolution layer 1 is 20 µs, an estimated convolution time of a convolution layer 2 is 50 µs, and an estimated convolution time of a convolution layer 3 is 10 µs. An expected pooling time of a pooling layer 1 corresponding to the convolution layer 1 is 18 µs, an expected pooling time of a pooling layer 2 corresponding to the convolution layer 2 is 53 µs, and an expected pooling time of a pooling layer 3 corresponding to the convolution layer 3 is 12 µs. An average value of the expected pooling times of the foregoing three pooling layers is calculated, to obtain an expected pooling value of about 28 µs ((18 µs+53 µs+12 µs)/3=28 µs).

Step S402. Predict to-be-processed data volumes of the plurality of pooling layers, and determine a basic pooling data volume according to the to-be-processed data volumes of the plurality of pooling layers.

Specifically, according to the depth, complexity, and an input data size of a convolutional neural network model, a to-be-processed data volume of each pooling layer in the convolutional neural network model is predicted. A minimum to-be-processed data volume is extracted from the to-be-processed data volumes of the plurality of pooling layers to serve as a basic pooling data volume. A minimum to-be-processed data volume is selected as the basic pooling data volume to reduce an area of a computing chip occupied during pooling, and maximize computing efficiency of the computing resource unit.

For example, there are three pooling layers in a convolutional neural network model, a to-be-processed data volume of a pooling layer 1 is 2 KB, a to-be-processed data volume of a pooling layer 2 is 3 KB, and a to-be-processed data volume of a pooling layer 3 is 5 KB. Therefore, 2 KB is a basic pooling data volume (2 KB<3 KB<5 KB).

Step S403. Determine a quantity of computing resource units used for pooling according to the expected pooling value, the basic pooling data volume, and a computing power value of the computing resource unit having an average clock frequency, the average clock frequency being an average value of a plurality of clock frequencies provided by a system.

Specifically, a product of the expected pooling value and the computing power value of the computing resource unit having the average clock frequency is divided by the basic pooling data volume, that is, (the expected pooling value*the computing power value of the computing resource unit having the average clock frequency)/the basic pooling data volume, to obtain the quantity of computing resource units used for pooling. Once being determined, the quantity of computing resource units is no longer adjusted in subsequent convolution and pooling, and only a frequency of the computing resource unit is adjusted. The average clock frequency is the average value of the plurality of clock frequencies provided by the system, the computing power value refers to an instruction processing capacity value of the computing resource unit, and a higher computing power value indicates a stronger instruction processing capacity of the computing resource unit.

In another implementation, step S403 may include determining how many computing resource units may be used for pooling according to the average expected pooling value, the basic pooling data volume, and a computing power value of a single computing resource unit running at an average clock frequency. The average clock frequency may be an average value of a plurality of clock frequencies provided by a system. To determine a number of computing resource units for pooling, the average expected pooling value is multiplied by the computing power value of the single computing resource unit having the average clock frequency, and then the product is divided by the basic pooling data volume.

Figure 6:
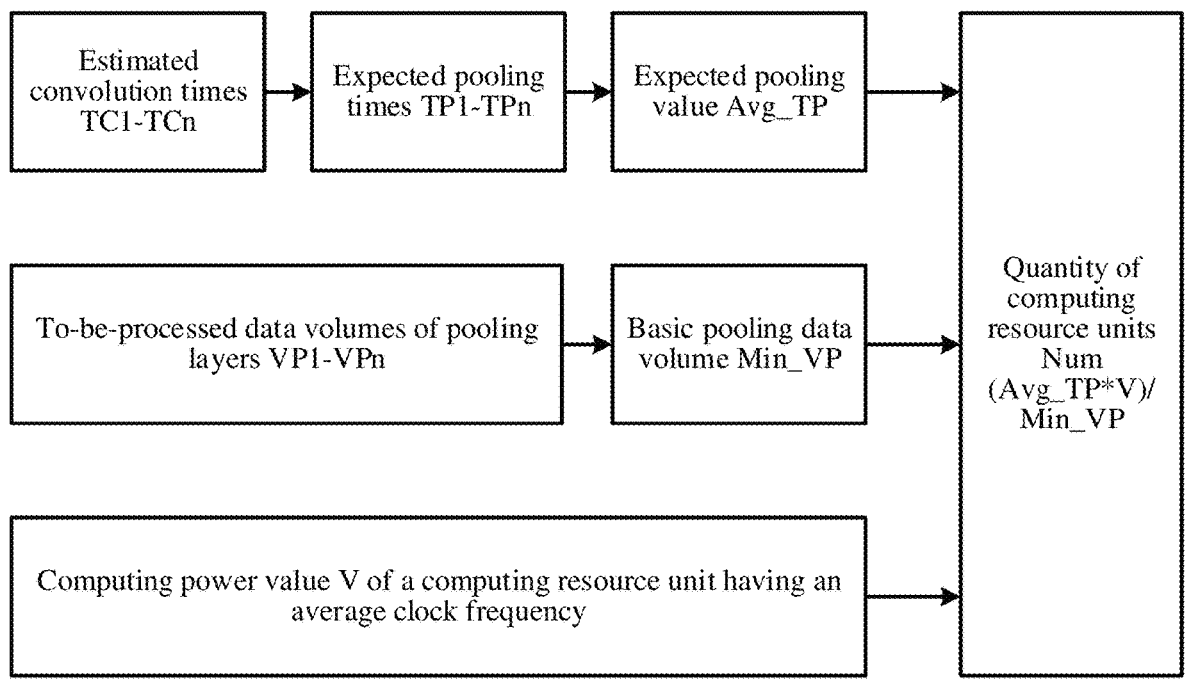
FIG. 6 is a schematic flowchart of determining a quantity of computing resource units according to an embodiment of this application.

FIG. 6 is a schematic flowchart of determining a quantity of computing resource units according to an embodiment of this application. As shown in FIG. 6, according to the depth, algorithm complexity, and an input data size of a convolutional neural network model, estimated convolution times $TC1$-$TCn$ corresponding to n convolution layers in the convolutional neural network model are predicted, where $TCn$ represents an estimated convolution time of an $n^{th}$ convolution layer. Expected pooling times $TP1$-$TPn$ of pooling layers corresponding to the convolution layers are predicted according to the plurality of estimated convolution times, where $TPn$ represents an expected pooling time of an $n^{th}$ pooling layer. An average value of the plurality of expected pooling times is calculated to obtain an expected pooling value $Avg\_TP$, that is, $Avg\_TP=(TP1+TP2+ \ldots +TPn)/n$. To-be-processed data volumes $VP1$-$VPn$ of the n pooling layers are predicted, where $VPn$ represents a to-be-processed data volume of an $n^{th}$ pooling layer. A minimum to-be-processed data volume is extracted from the foregoing plurality of to-be-processed data volumes to serve as a basic pooling data volume $Min\_VP$. According to the expected pooling value $Avg\_TP$, the basic pooling data volume $Min\_VP$, and a computing power value V of a computing resource unit having an average clock frequency, the quantity Num of computing resource units may be calculated in advance, that is, $Num=(Avg\_TP*V)/Min\_VP$.

Step S404. Obtain an expected pooling time of a target pooling layer and a to-be-processed data volume of the target pooling layer, and obtain a current clock frequency corresponding to the computing resource unit used for pooling, a difference between the expected pooling time of the target pooling layer and an estimated convolution time of a convolution layer associated with the target pooling layer being less than a time threshold.

Step S405. Determine a target clock frequency according to the expected pooling time of the target pooling layer and the to-be-processed data volume of the target pooling layer.

For the specific implementation of step S404 and step S405, reference may be made to the descriptions about step S101 and step S102 in the embodiment corresponding to FIG. 2, and for the specific process of determining a target clock frequency, reference may be made to step S201 to step S203 in FIG. 3 and step S301 to step S303 in FIG. 4. Details are not described herein again.

Step S406. Delete clock frequencies other than the target clock frequency in a plurality of clock frequencies provided by a system.

Specifically, the system provides a plurality of clock frequencies for the computing resource unit. To reduce power consumption, all (unused) clock frequencies other than the target clock frequency are deleted after the target clock frequency is determined.

Step S407. Switch the current clock frequency to the target clock frequency in a case that a convolution layer associated with the target pooling layer completes convolution and the current clock frequency is different from the target clock frequency, and perform pooling in the target pooling layer based on the computing resource unit having the target clock frequency.

For the specific implementation of step S407, reference may be made to the description about step S103 in the embodiment corresponding to FIG. 2, and details are not described herein again.

Figure 7:
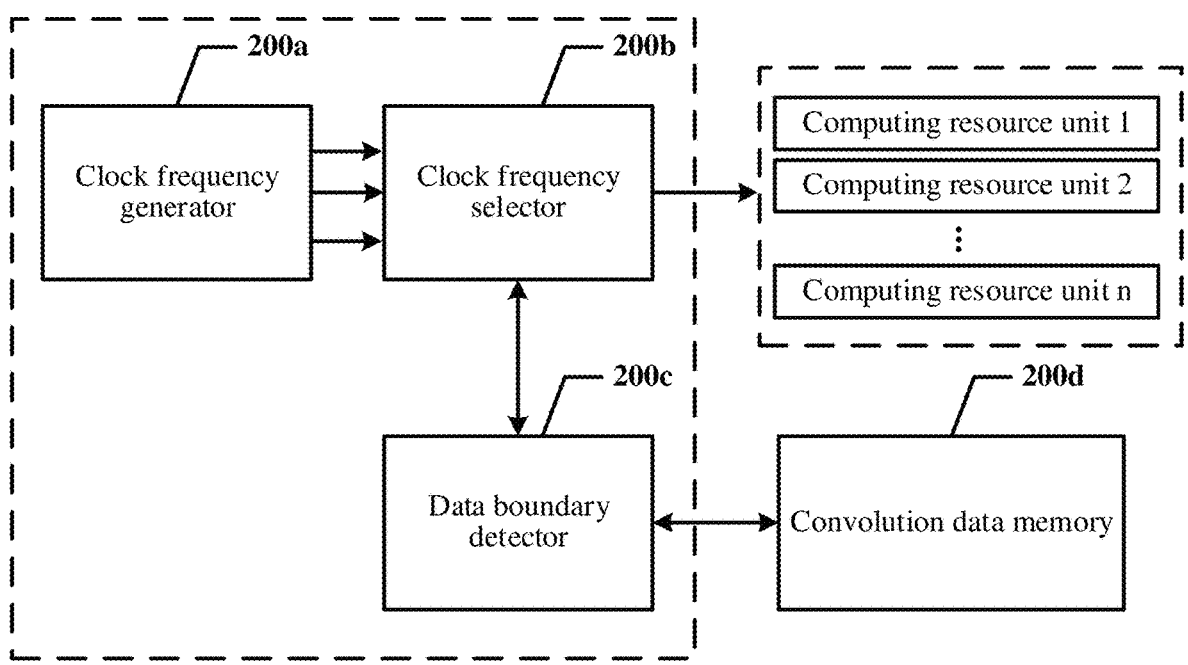
FIG. 7 is a schematic diagram of interaction for switching a target clock frequency according to an embodiment of this application.

FIG. 7 is a schematic diagram of interaction for switching a target clock frequency according to an embodiment of this application. As shown in FIG. 7, a clock frequency generator 200a in a system generates clocks with different frequencies, to drive different computing power values of a computing resource unit. A convolution data memory 200d stores convolution data generated after convolution. When convolution is being performed or pooling is being performed, a clock frequency selector 200b calculates a speedup ratio of a target pooling layer, and determines a target clock frequency. When a data boundary detector 200c detects that convolution data reaches a data boundary (that is, convolution is completed), the clock frequency selector 200b selects the target clock frequency for a computing resource unit 1, a computing resource unit 2, . . . , a computing resource unit n from a plurality of clock frequencies generated by the clock frequency generator 200a (the clock frequency selector 200b has determined the target clock frequency in a previous convolution process or pooling process), and deletes (that is, shields) the remaining clock frequencies, to reduce power consumption of the system. The clock frequency of the computing resource unit is switched to the target clock frequency, and pooling is performed on the convolution data by using the computing resource unit 1 having the target clock frequency, the computing resource unit 2 having the target clock frequency, . . . , the computing resource unit n having the target clock frequency. The data boundary detector 200c keeps performing detection in the convolution process. The clock frequency generator 200a, the clock frequency selector 200b, and the data boundary detector 200c may be integrated into the clock frequency controller 100g shown in FIG. 1B.

In some embodiments, the foregoing method may be further applied to a server. For example, a convolutional neural network model is deployed in an FPGA cloud server configured to perform cloud computing, that is, a computing resource pool for convolution computation, a convolution data storage unit, a computing resource pool for pooling computation, a pooling data storage unit, and a clock frequency controller (which may be the clock frequency controller 100g shown in FIG. 1B) are deployed on FPGA hardware in the FPGA cloud server, where the computing resource pool for pooling computation may include the computing resource unit 1, the computing resource unit 2, . . . , the computing resource unit n in the embodiment corresponding to FIG. 7. When convolution is being performed or pooling is being performed, the clock frequency controller calculates a speedup ratio of a target pooling layer according to an expected pooling time of the target pooling layer and an average pooling time of the target pooling layer, and determines a target clock frequency. After convolution is completed by using the computing resource pool for convolution computation, convolution data obtained by convolution is stored in the convolution data storage unit, and the clock frequency controller selects, from a plurality of clock frequencies provided by the FPGA, a predetermined target clock frequency for the computing resource pool for pooling computation, and shields the remaining clock frequencies, to reduce power consumption of the system. The clock frequency controller switches a current clock frequency to the target clock frequency, and the convolution data stored in the convolution data storage unit is pooled by using the computing resource pool that is used for pooling computation and that has the target clock frequency, and pooling data after pooling is stored in the pooling data storage unit. The FPGA may provide a powerful computing capacity, so that after the convolutional neural network model is built in the FPGA cloud server, the convolutional neural network model may be run smoothly.

According to this embodiment of this application, an expected pooling time of a target pooling layer and a to-be-processed data volume of the target pooling layer are obtained, and a current clock frequency corresponding to the computing resource unit used for pooling is obtained; a target clock frequency is determined according to the expected pooling time of the target pooling layer and the to-be-processed data volume of the target pooling layer; a current clock frequency is switched to the target clock frequency in a case that a convolution layer associated with the target pooling layer completes convolution and the current clock frequency is different from the target clock frequency; and pooling is performed in the target pooling layer based on the computing resource unit having the target clock frequency. A clock frequency of a computing resource unit may be dynamically adjusted according to an expected pooling time of a pooling layer and a to-be-processed data volume of the pooling layer, so that an actual pooling time of any pooling layer is close to an expected pooling time of the pooling layer, and the actual pooling time of any pooling layer matches an estimated convolution time of a corresponding convolution layer. Therefore, by adjusting the clock frequency of the computing resource unit, an actual pooling time and an estimated convolution time of any layer may be close to each other as required, thus avoiding idling of computing resources, and improving utilization of the computing resources.

Figure 8:
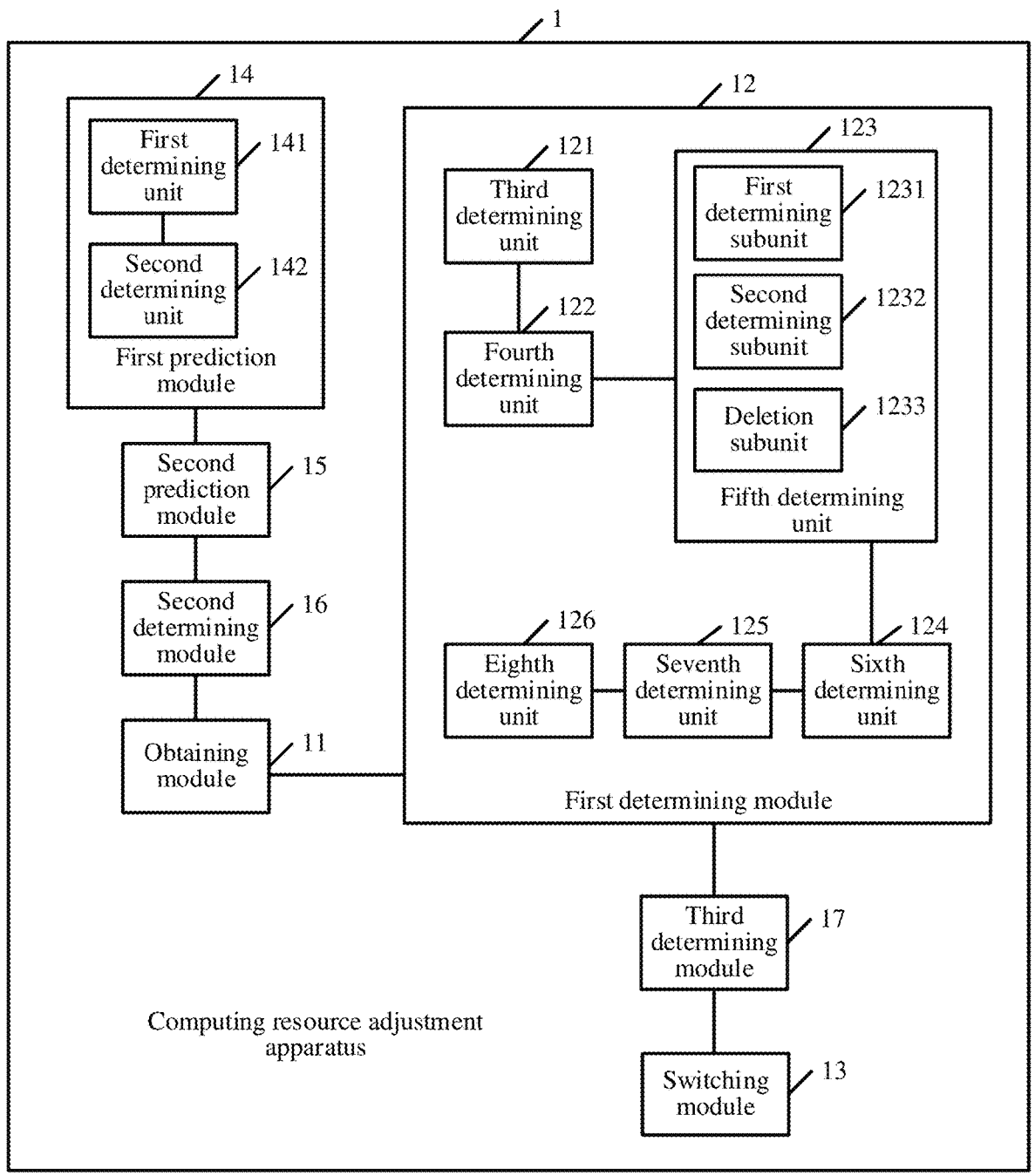
FIG. 8 is a schematic structural diagram of a computing resource adjustment apparatus according to an embodiment of this application.

Further, FIG. 8 is a schematic structural diagram of a computing resource adjustment apparatus according to an embodiment of this application. As shown in FIG. 8, the computing resource adjustment apparatus 1 may include: an obtaining module 11, a first determining module 12, and a switching module 13.

The obtaining module 11 is configured to obtain an expected pooling time of a target pooling layer and a to-be-processed data volume of the target pooling layer, and obtain a current clock frequency corresponding to a computing resource unit used for pooling, a difference between the expected pooling time of the target pooling layer and an estimated convolution time of a convolution layer associated with the target pooling layer being less than a time threshold.

The first determining module 12 is configured to determine a target clock frequency according to the expected pooling time of the target pooling layer and the to-be-processed data volume of the target pooling layer.

The switching module 13 is configured to switch the current clock frequency to the target clock frequency in a case that the convolution layer associated with the target pooling layer completes convolution and the current clock frequency is different from the target clock frequency, and perform pooling in the target pooling layer based on the computing resource unit having the target clock frequency.

For a specific implementation of functions of the obtaining module 11, the first determining module 12, and the switching module 13, reference may be made to step S101 to step S103 in the embodiment corresponding to FIG. 2, and details are not described herein again.

Referring to FIG. 8, the computing resource adjustment apparatus 1 may include: the obtaining module 11, the first determining module 12, and the switching module 13, and the computing resource adjustment apparatus 1 may further include: a first prediction module 14, a second prediction module 15, a second determining module 16, and a third determining module 17.

The first prediction module 14 is configured to predict estimated convolution times of a plurality of convolution layers, determine expected pooling times of a plurality of pooling layers according to the estimated convolution times of the plurality of convolution layers, and determine an expected pooling value according to the expected pooling times of the plurality of pooling layers.

The second prediction module 15 is configured to predict to-be-processed data volumes of the plurality of pooling layers, and determine a basic pooling data volume according to the to-be-processed data volumes of the plurality of pooling layers.

The second prediction module 15 is specifically configured to extract a minimum to-be-processed data volume from the to-be-processed data volumes of the plurality of pooling layers as the basic pooling data volume.

The second determining module 16 is configured to determine a quantity of computing resource units used for pooling according to the expected pooling value, the basic pooling data volume, and a computing power value of the computing resource unit having an average clock frequency, the average clock frequency being an average value of a plurality of clock frequencies provided by a system.

The third determining module 17 is configured to determine that the convolution layer associated with the target pooling layer completes convolution upon detecting that convolution data generated in the convolution layer associated with the target pooling layer reaches a data boundary.

For a specific implementation of functions of the first prediction module 14, the second prediction module 15, and the second determining module 16, reference may be made to step S401 to step S403 in the embodiment corresponding to FIG. 5, and for a specific implementation of functions of the third determining module 17, reference may be made to step S103 in the embodiment corresponding to FIG. 2, and details are not described herein again.

Referring to FIG. 8, the first prediction module 14 may include: a first determining unit 141 and a second determining unit 142.

The first determining unit 141 is configured to determine the expected pooling times of the plurality of pooling layers according to the estimated convolution times of the plurality of convolution layers, a difference between an estimated convolution time of a convolution layer and an expected pooling time of a pooling layer in the same layer being less than the time threshold.

The second determining unit 142 is configured to calculate an average value of the expected pooling times of the plurality of pooling layers, and determine the average value as the expected pooling value.

For a specific implementation of functions of the first determining unit 141 and the second determining unit 142, reference may be made to step S401 in the embodiment corresponding to FIG. 5, and details are not described herein again.

Referring to FIG. 8, the first determining module 12 may include: a third determining unit 121, a fourth determining unit 122, and a fifth determining unit 123.

The third determining unit 121 is configured to calculate a sum of computing power values of all the computing resource units having the average clock frequency, to obtain a total computing power value, and determine a ratio of the to-be-processed data volume of the target pooling layer to the total computing power value as an average pooling time of the target pooling layer.

The fourth determining unit 122 is configured to determine a ratio of the expected pooling time of the target pooling layer to the average pooling time of the target pooling layer as a speedup ratio of the target pooling layer.

The fifth determining unit 123 is configured to determine the target clock frequency according to the speedup ratio of the target pooling layer, a speedup ratio of a reference pooling layer, and the current clock frequency, the speedup ratio of the reference pooling layer being generated according to an expected pooling time of the reference pooling layer and a to-be-processed data volume of the reference pooling layer, and the reference pooling layer being a pooling layer that is adjacent to the target pooling layer and that is being processed or has been processed.

For a specific implementation of functions of the third determining unit 121, the fourth determining unit 122, and the fifth determining unit 123, reference may be made to step S201 to step S203 in the embodiment corresponding to FIG. 3, and details are not described herein again.

Further, referring to FIG. 8, the fifth determining unit 123 may include a first determining subunit 1231, a second determining subunit 1232, and a deletion subunit 1233.

The first determining subunit 1231 is configured to set the target clock frequency to a clock frequency the same as the current clock frequency in a case that the speedup ratio of the reference pooling layer is the same as the speedup ratio of the target pooling layer.

The second determining subunit 1232 is configured to determine a ratio of the speedup ratio of the reference pooling layer to the speedup ratio of the target pooling layer as a speedup factor in a case that the speedup ratio of the reference pooling layer is different from the speedup ratio of the target pooling layer, and determine a product of the speedup factor and the current clock frequency as the target clock frequency.

For a specific implementation of functions of the first determining subunit 1231, the second determining subunit 1232, and the deletion subunit 1233, reference may be made to step S203 in the embodiment corresponding to FIG. 3, and details are not described herein again.

Further, referring to FIG. 8, the fifth determining module 123 may include the first determining subunit 1231 and the second determining subunit 1232, and may further include the deletion subunit 1233.

The deletion subunit 1233 is configured to delete clock frequencies other than the target clock frequency in a plurality of clock frequencies provided by a system.

For a specific implementation of a function of the deletion subunit 1233, reference may be made to step S406 in the embodiment corresponding to FIG. 5, and details are not described herein again.

Referring to FIG. 8, the first determining module 12 may further include: a sixth determining unit 124, a seventh determining unit 125, and an eighth determining unit 126.

The sixth determining unit 124 is configured to calculate a sum of computing power values of all the computing resource units having the average clock frequency, to obtain a total computing power value, and determine a ratio of the to-be-processed data volume of the target pooling layer to the total computing power value as an average pooling time of the target pooling layer.

The seventh determining unit 125 is configured to determine a ratio of the expected pooling time of the target pooling layer to the average pooling time of the target pooling layer as a speedup ratio of the target pooling layer.

The eighth determining unit 126 is configured to determine the target clock frequency according to the speedup ratio of the target pooling layer and the average clock frequency.

The eighth determining unit 126 is specifically configured to determine a product of a reciprocal of the speedup ratio of the target pooling layer and the average clock frequency as the target clock frequency.

For a specific implementation of functions of the sixth determining unit 124, the seventh determining unit 125, and the eighth determining unit 126, reference may be made to step S301 to step S303 in the embodiment corresponding to FIG. 4, and details are not described herein again.

According to this embodiment of this application, an expected pooling time of a target pooling layer and a to-be-processed data volume of the target pooling layer are obtained, and a current clock frequency corresponding to a computing resource unit used for pooling is obtained; a target clock frequency is determined according to the expected pooling time of the target pooling layer and the to-be-processed data volume of the target pooling layer; the current clock frequency is switched to the target clock frequency in a case that a convolution layer associated with the target pooling layer completes convolution and the current clock frequency is different from the target clock frequency; and pooling is performed in the target pooling layer based on the computing resource unit having the target clock frequency. A clock frequency of a computing resource unit may be dynamically adjusted according to an expected pooling time of a pooling layer and a to-be-processed data volume of the pooling layer, so that an actual pooling time of any pooling layer is close to an expected pooling time of the pooling layer, and the actual pooling time of any pooling layer matches an estimated convolution time of a corresponding convolution layer. Therefore, by adjusting the clock frequency of the computing resource unit, an actual pooling time and an estimated convolution time of any layer may be close to each other as required, thus avoiding idling of computing resources, and improving utilization of the computing resources.

Figure 9:
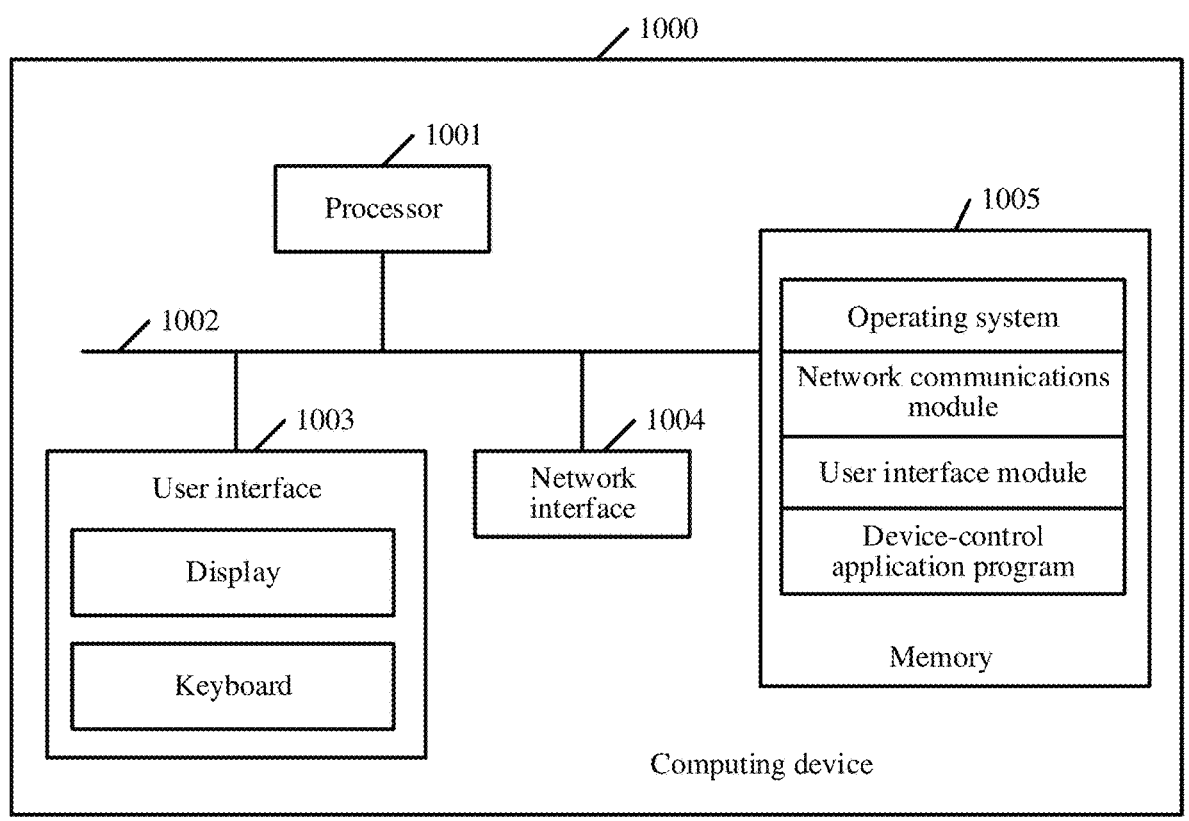
FIG. 9 is a schematic structural diagram of a terminal device according to an embodiment of this application.

FIG. 9 is a schematic structural diagram of a computing device according to an embodiment of this application. Herein, the computing device may be a terminal device or a server. As shown in FIG. 9, the computing resource adjustment apparatus in FIG. 8 may be applied to the computing device 1000. The computing device 1000 may include: a processor 1001, a network interface 1004, and a memory 1005. In addition, the computing device 1000 may further include: a user interface 1003 and at least one communications bus 1002. The communications bus 1002 is configured to implement connection and communication between these components. The user interface 1003 may include a display and a keyboard. Optionally, the user interface 1003 may further include a standard wired interface and a wireless interface. In some embodiments, the network interface 1004 may include a standard wired interface and a wireless interface (such as a WiFi interface). The memory 1005 may be a high-speed RAM, or may be a non-volatile memory, for example, at least one magnetic disk memory. In some embodiments, the memory 1005 may further be at least one storage apparatus that is located away from the processor 1001. As shown in FIG. 9, the memory 1005 used as a computer storage medium may include an operating system, a network communications module, a user interface module, and a device-control application program.

In the computing device 1000 shown in FIG. 9, the network interface 1004 is mainly configured to provide a network communication function. The user interface 1003 is mainly configured to provide an input interface for a user. The processor 1001 may be configured to invoke the device-control application program stored in the memory 1005, to implement the following operations:

obtaining an expected pooling time of a target pooling layer and a to-be-processed data volume of the target pooling layer, and obtaining a current clock frequency corresponding to a computing resource unit used for pooling, a difference between the expected pooling time of the target pooling layer and an estimated convolution time of a convolution layer associated with the target pooling layer being less than a time threshold;

determining a target clock frequency according to the expected pooling time of the target pooling layer and the to-be-processed data volume of the target pooling layer; and switching the current clock frequency to the target clock frequency in a case that the convolution layer associated with the target pooling layer completes convolution and the current clock frequency is different from the target clock frequency, and performing pooling in the target pooling layer based on the computing resource unit having the target clock frequency.

In an embodiment, the processor 1001 further performs the following step:

predicting estimated convolution times of a plurality of convolution layers, determining expected pooling times of a plurality of pooling layers according to the estimated convolution times of the plurality of convolution layers, and determining an expected pooling value according to the expected pooling times of the plurality of pooling layers;

predicting to-be-processed data volumes of the plurality of pooling layers, and determining a basic pooling data volume according to the to-be-processed data volumes of the plurality of pooling layers; and determining a quantity of computing resource units used for pooling according to the expected pooling value, the basic pooling data volume, and a computing power value of the computing resource unit having an average clock frequency, the average clock frequency being an average value of a plurality of clock frequencies provided by a system.

In an embodiment, when performing the step of determining expected pooling times of a plurality of pooling layers according to the estimated convolution times of the plurality of convolution layers, and determining an expected pooling value according to the expected pooling times of the plurality of pooling layers, the processor 1001 specifically performs the following steps:

determining the expected pooling times of the plurality of pooling layers according to the estimated convolution times of the plurality of convolution layers, a difference between an estimated convolution time of a convolution layer and an expected pooling time of a pooling layer in the same layer being less than the time threshold; and calculating an average value of the expected pooling times of the plurality of pooling layers, and determining the average value as the expected pooling value.

In an embodiment, when performing the step of determining a basic pooling data volume according to the to-be-processed data volumes of the plurality of pooling layers, the processor 1001 specifically performs the following step:

extracting a minimum to-be-processed data volume from the to-be-processed data volumes of the plurality of pooling layers as the basic pooling data volume.

In an embodiment, when performing the step of determining a target clock frequency according to the expected pooling time of the target pooling layer and the to-be-processed data volume of the target pooling layer, the processor 1001 specifically performs the following steps:

calculating a sum of computing power values of all the computing resource units having the average clock frequency, to obtain a total computing power value, and determining a ratio of the to-be-processed data volume of the target pooling layer to the total computing power value as an average pooling time of the target pooling layer;

determining a ratio of the expected pooling time of the target pooling layer to the average pooling time of the target pooling layer as a speedup ratio of the target pooling layer; and determining the target clock frequency according to the speedup ratio of the target pooling layer, a speedup ratio of a reference pooling layer, and the current clock frequency, the speedup ratio of the reference pooling layer being generated according to an expected pooling time of the reference pooling layer and a to-be-processed data volume of the reference pooling layer, and the reference pooling layer being a pooling layer that is adjacent to the target pooling layer and that is being processed or has been processed.

In an embodiment, when performing the step of determining a target clock frequency according to the speedup ratio of the target pooling layer, a speedup ratio of a reference pooling layer, and the current clock frequency, the processor 1001 specifically performs the following steps:

setting the target clock frequency to a clock frequency the same as the current clock frequency in a case that the speedup ratio of the reference pooling layer is the same as the speedup ratio of the target pooling layer; and determining a ratio of the speedup ratio of the reference pooling layer to the speedup ratio of the target pooling layer as a speedup factor, and determining a product of the speedup factor and the current clock frequency as the target clock frequency in a case that the speedup ratio of the reference pooling layer is different from the speedup ratio of the target pooling layer.

In an embodiment, the processor 1001 further performs the following step:

deleting clock frequencies other than the target clock frequency in the plurality of clock frequencies provided by the system.

In an embodiment, when performing the step of determining a target clock frequency according to the expected pooling time of the target pooling layer and the to-be-processed data volume of the target pooling layer, the processor 1001 specifically performs the following steps:

calculating a sum of computing power values of all the computing resource units having the average clock frequency, to obtain a total computing power value, and determining a ratio of the to-be-processed data volume of the target pooling layer to the total computing power value as an average pooling time of the target pooling layer;

determining a ratio of the expected pooling time of the target pooling layer to the average pooling time of the target pooling layer as a speedup ratio of the target pooling layer; and determining the target clock frequency according to the speedup ratio of the target pooling layer and the average clock frequency.

In an embodiment, when performing the step of determining a target clock frequency according to the speedup ratio of the target pooling layer and the average clock frequency, the processor 1001 specifically performs the following step:

determining a product of a reciprocal of the speedup ratio of the target pooling layer and the average clock frequency as the target clock frequency.

In an embodiment, the processor 1001 further performs the following step:

determining that the convolution layer associated with the target pooling layer completes convolution upon detecting that convolution data generated in the convolution layer associated with the target pooling layer reaches a data boundary.

According to this embodiment of this application, an expected pooling time of a target pooling layer and a to-be-processed data volume of the target pooling layer are obtained, and a current clock frequency corresponding to the computing resource unit used for pooling is obtained; a target clock frequency is determined according to the expected pooling time of the target pooling layer and the to-be-processed data volume of the target pooling layer; the current clock frequency is switched to the target clock frequency in a case that a convolution layer associated with the target pooling layer completes convolution and the current clock frequency is different from the target clock frequency; and pooling is performed in the target pooling layer based on the computing resource unit having the target clock frequency. A clock frequency of a computing resource unit may be dynamically adjusted according to an expected pooling time of a pooling layer and a to-be-processed data volume of the pooling layer, so that an actual pooling time of any pooling layer is close to an expected pooling time of the pooling layer, and the actual pooling time of any pooling layer matches an estimated convolution time of a corresponding convolution layer. Therefore, by adjusting the clock frequency of the computing resource unit, an actual pooling time and an estimated convolution time of any layer are close to each other as required, thus avoiding idling of computing resources, and improving utilization of the computing resources.

It is to be understood that the terminal device 1000 described in the embodiment of this application may perform descriptions about the computing resource adjustment method in the embodiments corresponding to FIG. 2 to FIG. 7, or may execute descriptions about the computing resource adjustment apparatus in the embodiment corresponding to FIG. 8, and details are not described herein again. In addition, beneficial effects achieved by using the same method are not described herein again.

In addition, an embodiment of this application further provides a computer storage medium. The computer storage medium stores a computer program executed by the computing resource adjustment apparatus 1 mentioned above, and the computer program includes a program instruction. When executing the program instruction, the processor can perform the descriptions about the computing resource adjustment method in the embodiments corresponding to FIG. 2 to FIG. 7. Therefore, details are not described herein again. In addition, beneficial effects achieved by using the same method are not described herein again. For technical details that are not disclosed in the embodiment of the computer storage medium in this application, refer to descriptions of the method embodiments of this application.

A person of ordinary skill in the art may understand that all or some of the processes of the methods in the embodiments may be implemented by a computer program instructing relevant hardware. The program may be stored in a computer-readable storage medium. When the program runs, the processes of the methods in the embodiments may be performed. The foregoing storage medium may be a magnetic disk, an optical disc, a read-only memory (ROM), a random access memory (RAM), or the like.

The foregoing descriptions are merely preferred embodiments of this application, but are not intended to limit this application. Therefore, equivalent changes made according to the claims of this application still fall within the scope of this application.

What is claimed is:

1. A method for adjusting computing resource, comprising:
   obtaining, by a device comprising a memory storing instructions and a processor in communication with the memory, an expected pooling time of a target pooling layer and a to-be-processed data volume of the target pooling layer, a difference between the expected pooling time of the target pooling layer and an estimated convolution time of a convolution layer associated with the target pooling layer being less than a time threshold;
   obtaining, by the device, a current clock frequency corresponding to at least one computing resource unit used for pooling;
   determining, by the device, a target clock frequency according to the expected pooling time of the target pooling layer and the to-be-processed data volume of the target pooling layer;
   in response to that the convolution layer associated with the target pooling layer completes convolution and the current clock frequency is different from the target clock frequency, switching, by the device, the current clock frequency of the at least one computing resource unit to the target clock frequency, and performing pooling in the target pooling layer based on the at least one computing resource unit having the target clock frequency,
   detecting, by the device, whether convolution data generated in the convolution layer associated with the target pooling layer reaches a data boundary; and
   in response to detecting that the convolution data generated in the convolution layer associated with the target pooling layer reaches the data boundary, determining, by the device, that the convolution layer associated with the target pooling layer completes convolution.

2. The method according to claim 1, further comprising:
   predicting, by the device, estimated convolution times of a plurality of convolution layers;
   determining, by the device, expected pooling times of a plurality of pooling layers according to the estimated convolution times of the plurality of convolution layers;
   determining, by the device, an expected pooling value according to the expected pooling times of the plurality of pooling layers;
   predicting, by the device, to-be-processed data volumes of the plurality of pooling layers;
   determining, by the device, a basic pooling data volume according to the to-be-processed data volumes of the plurality of pooling layers; and
   determining, by the device, a quantity of the at least one computing resource unit used for pooling according to the expected pooling value, the basic pooling data volume, and a computing power value of a computing resource unit having an average clock frequency, the average clock frequency being an average value of a plurality of clock frequencies provided by a system.

3. The method according to claim 2, wherein:
   the determining the expected pooling times of the plurality of pooling layers according to the estimated convolution times of the plurality of convolution layers comprises:
      determining, by the device, the expected pooling times of the plurality of pooling layers according to the estimated convolution times of the plurality of convolution layers, a difference between an estimated convolution time of a convolution layer and an expected pooling time of a pooling layer in a same layer corresponding to the convolution layer being less than the time threshold; and
   the determining the expected pooling value according to the expected pooling times of the plurality of pooling layers comprises:
      calculating, by the device, an average value of the expected pooling times of the plurality of pooling layers, and
      determining, by the device, the average value as the expected pooling value.

4. The method according to claim 2, wherein the determining the basic pooling data volume according to the to-be-processed data volumes of the plurality of pooling layers specifically comprises:
   extracting a minimum to-be-processed data volume from the to-be-processed data volumes of the plurality of pooling layers as the basic pooling data volume.

5. The method according to claim 2, wherein the determining the target clock frequency according to the expected pooling time of the target pooling layer and the to-be-processed data volume of the target pooling layer comprises:
   calculating, by the device, a sum of computing power values of the at least one computing resource unit having the average clock frequency, to obtain a total computing power value;
   determining, by the device, a ratio of the to-be-processed data volume of the target pooling layer to the total computing power value as an average pooling time of the target pooling layer;
   determining, by the device, a ratio of the expected pooling time of the target pooling layer to the average pooling time of the target pooling layer as a speedup ratio of the target pooling layer; and
   determining, by the device, the target clock frequency according to the speedup ratio of the target pooling layer, a speedup ratio of a reference pooling layer, and the current clock frequency, wherein:
      the reference pooling layer being a pooling layer that is adjacent to the target pooling layer and that is processed prior to the target pooling layer, and
      the speedup ratio of the reference pooling layer is generated according to an expected pooling time of the reference pooling layer and a to-be-processed data volume of the reference pooling layer.

6. The method according to claim 5, wherein the determining the target clock frequency according to the speedup ratio of the target pooling layer, a speedup ratio of a reference pooling layer, and the current clock frequency comprises:
   in response to the speedup ratio of the reference pooling layer being same as the speedup ratio of the target pooling layer, setting, by the device, the target clock frequency to a clock frequency being same as the current clock frequency; and
   in response to the speedup ratio of the reference pooling layer being different from the speedup ratio of the target pooling layer:
      determining, by the device, a ratio of the speedup ratio of the reference pooling layer to the speedup ratio of the target pooling layer as a speedup factor, and determining, by the device, a product of the speedup factor and the current clock frequency as the target clock frequency.

7. The method according to claim 6, wherein after the determining the product of the speedup factor and the current clock frequency as the target clock frequency, the method further comprises:
deleting, by the device, clock frequencies other than the target clock frequency in the plurality of clock frequencies provided by the system.

8. The method according to claim 2, wherein the determining the target clock frequency according to the expected pooling time of the target pooling layer and the to-be-processed data volume of the target pooling layer comprises:
calculating, by the device, a sum of computing power values of the at least one computing resource unit having the average clock frequency, to obtain a total computing power value;
determining, by the device, a ratio of the to-be-processed data volume of the target pooling layer to the total computing power value as an average pooling time of the target pooling layer;
determining, by the device, a ratio of the expected pooling time of the target pooling layer to the average pooling time of the target pooling layer as a speedup ratio of the target pooling layer; and
determining, by the device, the target clock frequency according to the speedup ratio of the target pooling layer and the average clock frequency.

9. The method according to claim 8, wherein the determining the target clock frequency according to the speedup ratio of the target pooling layer and the average clock frequency comprises:
determining, by the device, a product of a reciprocal of the speedup ratio of the target pooling layer and the average clock frequency as the target clock frequency.

10. An apparatus for adjusting computing resource, comprising:
a memory storing instructions; and
a processor in communication with the memory, wherein, when the processor executes the instructions, the processor is configured to cause the apparatus to:
obtain an expected pooling time of a target pooling layer and a to-be-processed data volume of the target pooling layer, a difference between the expected pooling time of the target pooling layer and an estimated convolution time of a convolution layer associated with the target pooling layer being less than a time threshold,
obtain a current clock frequency corresponding to at least one computing resource unit used for pooling,
determine a target clock frequency according to the expected pooling time of the target pooling layer and the to-be-processed data volume of the target pooling layer,
in response to that the convolution layer associated with the target pooling layer completes convolution and the current clock frequency is different from the target clock frequency, switch the current clock frequency of the at least one computing resource unit to the target clock frequency, and perform pooling in the target pooling layer based on the at least one computing resource unit having the target clock frequency,
detect whether convolution data generated in the convolution layer associated with the target pooling layer reaches a data boundary, and in response to detecting that the convolution data generated in the convolution layer associated with the target pooling layer reaches the data boundary, determine that the convolution layer associated with the target pooling layer completes convolution.

11. The apparatus according to claim 10, wherein, when the processor executes the instructions, the processor is further configured to cause the apparatus to:
predict estimated convolution times of a plurality of convolution layers;
determine expected pooling times of a plurality of pooling layers according to the estimated convolution times of the plurality of convolution layers;
determine an expected pooling value according to the expected pooling times of the plurality of pooling layers;
predict to-be-processed data volumes of the plurality of pooling layers;
determine a basic pooling data volume according to the to-be-processed data volumes of the plurality of pooling layers; and
determine a quantity of the at least one computing resource unit used for pooling according to the expected pooling value, the basic pooling data volume, and a computing power value of a computing resource unit having an average clock frequency, the average clock frequency being an average value of a plurality of clock frequencies provided by a system.

12. The apparatus according to claim 11, wherein:
when the processor is configured to cause the apparatus to determine the expected pooling times of the plurality of pooling layers according to the estimated convolution times of the plurality of convolution layers, the processor is configured to cause the apparatus to:
determine the expected pooling times of the plurality of pooling layers according to the estimated convolution times of the plurality of convolution layers, a difference between an estimated convolution time of a convolution layer and an expected pooling time of a pooling layer in a same layer corresponding to the convolution layer being less than the time threshold; and
when the processor is configured to cause the apparatus to determine the expected pooling value according to the expected pooling times of the plurality of pooling layers, the processor is configured to cause the apparatus to:
calculate an average value of the expected pooling times of the plurality of pooling layers, and
determine the average value as the expected pooling value.

13. The apparatus according to claim 11, wherein, when the processor is configured to cause the apparatus to determine the target clock frequency according to the expected pooling time of the target pooling layer and the to-be-processed data volume of the target pooling layer, the processor is configured to cause the apparatus to:
calculate a sum of computing power values of the at least one computing resource unit having the average clock frequency, to obtain a total computing power value;
determine a ratio of the to-be-processed data volume of the target pooling layer to the total computing power value as an average pooling time of the target pooling layer;

determine a ratio of the expected pooling time of the target pooling layer to the average pooling time of the target pooling layer as a speedup ratio of the target pooling layer; and determine the target clock frequency according to the speedup ratio of the target pooling layer, a speedup ratio of a reference pooling layer, and the current clock frequency, wherein:

the reference pooling layer being a pooling layer that is adjacent to the target pooling layer and that is processed prior to the target pooling layer, and the speedup ratio of the reference pooling layer is generated according to an expected pooling time of the reference pooling layer and a to-be-processed data volume of the reference pooling layer.

14. The apparatus according to claim 11, wherein, when the processor is configured to cause the apparatus to determine the target clock frequency according to the expected pooling time of the target pooling layer and the to-be-processed data volume of the target pooling layer, the processor is configured to cause the apparatus to:

calculate a sum of computing power values of the at least one computing resource unit having the average clock frequency, to obtain a total computing power value;

determine a ratio of the to-be-processed data volume of the target pooling layer to the total computing power value as an average pooling time of the target pooling layer;

determine a ratio of the expected pooling time of the target pooling layer to the average pooling time of the target pooling layer as a speedup ratio of the target pooling layer; and determine the target clock frequency according to the speedup ratio of the target pooling layer and the average clock frequency.

15. A non-transitory computer readable storage medium storing computer readable instructions, wherein, the computer readable instructions, when executed by a processor, are configured to cause the processor to perform:

obtaining an expected pooling time of a target pooling layer and a to-be-processed data volume of the target pooling layer, a difference between the expected pooling time of the target pooling layer and an estimated convolution time of a convolution layer associated with the target pooling layer being less than a time threshold, obtaining a current clock frequency corresponding to at least one computing resource unit used for pooling, determining a target clock frequency according to the expected pooling time of the target pooling layer and the to-be-processed data volume of the target pooling layer, in response to that the convolution layer associated with the target pooling layer completes convolution and the current clock frequency is different from the target clock frequency, switching the current clock frequency of the at least one computing resource unit to the target clock frequency, and performing pooling in the target pooling layer based on the at least one computing resource unit having the target clock frequency, detecting whether convolution data generated in the convolution layer associated with the target pooling layer reaches a data boundary; and in response to detecting that the convolution data generated in the convolution layer associated with the target pooling layer reaches the data boundary, determining that the convolution layer associated with the target pooling layer completes convolution.

16. The non-transitory computer readable storage medium according to claim 15, wherein, the computer readable instructions, when executed by the processor, are configured to cause the processor to further perform:

predicting estimated convolution times of a plurality of convolution layers;

determining expected pooling times of a plurality of pooling layers according to the estimated convolution times of the plurality of convolution layers;

determining an expected pooling value according to the expected pooling times of the plurality of pooling layers;

predicting to-be-processed data volumes of the plurality of pooling layers;

determining a basic pooling data volume according to the to-be-processed data volumes of the plurality of pooling layers; and determining a quantity of the at least one computing resource unit used for pooling according to the expected pooling value, the basic pooling data volume, and a computing power value of a computing resource unit having an average clock frequency, the average clock frequency being an average value of a plurality of clock frequencies provided by a system.

17. The non-transitory computer readable storage medium according to claim 16, wherein:

when the computer readable instructions are configured to cause the processor to perform determining the expected pooling times of the plurality of pooling layers according to the estimated convolution times of the plurality of convolution layers, the computer readable instructions are configured to cause the processor to perform:

determining the expected pooling times of the plurality of pooling layers according to the estimated convolution times of the plurality of convolution layers, a difference between an estimated convolution time of a convolution layer and an expected pooling time of a pooling layer in a same layer corresponding to the convolution layer being less than the time threshold; and when the computer readable instructions are configured to cause the processor to perform determining the expected pooling value according to the expected pooling times of the plurality of pooling layers, the computer readable instructions are configured to cause the processor to perform:

calculating an average value of the expected pooling times of the plurality of pooling layers, and determining the average value as the expected pooling value.

18. The non-transitory computer readable storage medium according to claim 16, wherein, when the computer readable instructions are configured to cause the processor to perform determining the target clock frequency according to the expected pooling time of the target pooling layer and the to-be-processed data volume of the target pooling layer, the computer readable instructions are configured to cause the processor to perform:

calculating a sum of computing power values of the at least one computing resource unit having the average clock frequency, to obtain a total computing power value;

determining a ratio of the to-be-processed data volume of the target pooling layer to the total computing power value as an average pooling time of the target pooling layer;

determining a ratio of the expected pooling time of the target pooling layer to the average pooling time of the target pooling layer as a speedup ratio of the target pooling layer; and determining the target clock frequency according to the speedup ratio of the target pooling layer, a speedup ratio of a reference pooling layer, and the current clock frequency, wherein:

the reference pooling layer being a pooling layer that is adjacent to the target pooling layer and that is processed prior to the target pooling layer, and the speedup ratio of the reference pooling layer is generated according to an expected pooling time of the reference pooling layer and a to-be-processed data volume of the reference pooling layer.

19. The non-transitory computer readable storage medium according to claim 16, wherein, when the computer readable instructions are configured to cause the processor to perform determining determine the target clock frequency according to the expected pooling time of the target pooling layer and the to-be-processed data volume of the target pooling layer, the computer readable instructions are configured to cause the processor to perform:

calculating a sum of computing power values of the at least one computing resource unit having the average clock frequency, to obtain a total computing power value;

determining a ratio of the to-be-processed data volume of the target pooling layer to the total computing power value as an average pooling time of the target pooling layer;

determining a ratio of the expected pooling time of the target pooling layer to the average pooling time of the target pooling layer as a speedup ratio of the target pooling layer; and determining the target clock frequency according to the speedup ratio of the target pooling layer and the average clock frequency.

* * * * *